US011972097B2

(12) United States Patent
Solomon et al.

(10) Patent No.: US 11,972,097 B2
(45) Date of Patent: Apr. 30, 2024

(54) SELECTING CONTENT IN INK DOCUMENTS USING A HIERARCHICAL DATA STRUCTURE

(71) Applicant: Microsoft Technology Licensing, LLC, Redmond, WA (US)

(72) Inventors: Oz Solomon, Maple (CA); Erich Søren Finkelstein, Bellevue, WA (US); Gary Lee Caldwell, Redmond, WA (US); Nathan James Fish, San Francisco, CA (US); Sergey Aleksandrovich Doroshenko, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/897,193

(22) Filed: Aug. 28, 2022

(65) Prior Publication Data

US 2022/0404957 A1     Dec. 22, 2022

Related U.S. Application Data

(63) Continuation of application No. 17/117,149, filed on Dec. 10, 2020, now Pat. No. 11,531,454.

(51) Int. Cl.
*G06F 3/04842* (2022.01)
*G06F 3/04883* (2022.01)
(Continued)

(52) U.S. Cl.
CPC ...... *G06F 3/04842* (2013.01); *G06F 3/04883* (2013.01); *G06F 9/451* (2018.02);
(Continued)

(58) Field of Classification Search
CPC .. G06F 3/04842; G06F 3/04883; G06F 9/451; G06F 40/137; G06F 40/14;
(Continued)

(56) References Cited

U.S. PATENT DOCUMENTS 5,553,224 A  *  9/1996  Saund ..................... G06T 11/00
                                                       345/619
5,680,478 A  *  10/1997  Wang ................... G06V 30/413
                                                       382/176
(Continued)

FOREIGN PATENT DOCUMENTS

EP      1335272 A2      8/2003
EP      1973063 A1      9/2008
WO      2014200736 A1   12/2014

OTHER PUBLICATIONS

Agafonkin, Vladimir, "A dive into spatial search algorithms: Searching through millions of points in an instant," available at https://blog.mapbox.com/a-dive-into-spatial-search-algorithms-ebd0c5e39d2a, Medium, Apr. 27, 2017, 12 pages.

(Continued)

*Primary Examiner* — Justin R. Blaufeld

(57) ABSTRACT

Technology is described herein for facilitating a user's interaction with a digital ink document. The technology internally represents the ink document using a data structure having a hierarchy of nodes. The nodes describe respective elements in the ink document. The technology leverages the data structure to identify a set of nodes that grows upon the user's repeated selection of a particular part of the ink document. At each stage of the selection, the technology highlights a set of elements in the ink document that correspond to the current set of identified nodes. According to another illustrative aspect, the technology produces the data structure by modifying an original data structure provided by a text analysis engine. The technology performs this task with the objective of accommodating structured interaction by the user with the ink document.

18 Claims, 10 Drawing Sheets

(51) Int. Cl.
*G06F 9/451* (2018.01)
*G06F 40/137* (2020.01)
*G06F 40/14* (2020.01)
*G06F 40/146* (2020.01)
*G06F 40/171* (2020.01)
*G06V 30/32* (2022.01)
*G06V 30/414* (2022.01)
*G06V 30/416* (2022.01)

(52) U.S. Cl.
CPC ............ *G06F 40/137* (2020.01); *G06F 40/14* (2020.01); *G06F 40/146* (2020.01); *G06F 40/171* (2020.01); *G06V 30/333* (2022.01); *G06V 30/414* (2022.01); *G06V 30/416* (2022.01)

(58) Field of Classification Search
CPC ... G06F 40/146; G06F 40/171; G06V 30/333; G06V 30/414; G06V 30/416
See application file for complete search history.

(56) References Cited

U.S. PATENT DOCUMENTS

| | | | | |
|---|---|---|---|---|
| 6,903,751 | B2* | 6/2005 | Saund | G06T 11/60 345/619 |
| 7,370,288 | B1* | 5/2008 | Simmons | G06F 3/04842 715/854 |
| 11,074,403 | B1* | 7/2021 | Yost | G06F 40/18 |
| 2003/0156145 | A1* | 8/2003 | Hullender | G06F 3/04883 715/863 |
| 2004/0141648 | A1* | 7/2004 | Dodge | G06V 30/1423 382/188 |
| 2005/0044106 | A1* | 2/2005 | Duncan | G06F 40/103 |
| 2005/0053283 | A1* | 3/2005 | Wakeam | G06V 30/1456 382/186 |
| 2005/0175245 | A1 | 8/2005 | Sutanto et al. | |
| 2006/0061776 | A1* | 3/2006 | Chen | G06F 40/171 358/1.1 |
| 2006/0085740 | A1* | 4/2006 | Ye | G06F 40/205 715/230 |
| 2006/0147117 | A1* | 7/2006 | Wakeam | G06V 30/32 717/142 |
| 2006/0188162 | A1* | 8/2006 | Szilagyi | G06F 8/70 382/229 |
| 2006/0210163 | A1 | 9/2006 | Garside et al. | |
| 2006/0210172 | A1* | 9/2006 | Sutanto | G06V 30/347 382/229 |
| 2006/0271580 | A1* | 11/2006 | Ye | G06V 30/347 |
| 2008/0232690 | A1* | 9/2008 | Saund | G06V 30/32 382/187 |
| 2008/0260241 | A1* | 10/2008 | Ye | G06F 40/171 382/159 |
| 2010/0174983 | A1* | 7/2010 | Levy | G06F 40/174 715/256 |
| 2010/0174985 | A1* | 7/2010 | Levy | G06F 40/106 715/244 |
| 2012/0185766 | A1* | 7/2012 | Mansfield | G06F 40/137 715/246 |
| 2012/0269434 | A1* | 10/2012 | Atkins | B42D 1/08 382/175 |
| 2013/0042172 | A1* | 2/2013 | Mansfield | G06F 40/143 715/234 |
| 2014/0164352 | A1* | 6/2014 | Denninghoff | H03H 9/02622 707/711 |
| 2016/0232204 | A1* | 8/2016 | Zholudev | G06F 40/117 |
| 2016/0274761 | A1* | 9/2016 | Alonso Ruiz | G06F 3/0484 |
| 2017/0262700 | A1* | 9/2017 | Iskander | G06F 3/04842 |
| 2017/0285914 | A1* | 10/2017 | Ellbogen | G06F 3/0482 |
| 2018/0341627 | A1* | 11/2018 | Moldovean | G06F 16/9027 |
| 2022/0187981 | A1 | 6/2022 | Solomon et al. | |
| 2022/0188541 | A1 | 6/2022 | Elachqar et al. | |
| 2022/0188542 | A1 | 6/2022 | Solomon et al. | |

OTHER PUBLICATIONS

"R-tree," Wikipedia article, available at https://en.wikipedia.org/wiki/R-tree, accessed on Nov. 27, 2020, 9 pages.

Microsoft WORD document, example of double-click, triple-click, and quadruple-click behavior in a typewritten text document in WORD program, WORD program provided by Microsoft Corporation of Redmond, Washington, example produced on Nov. 29, 2020, 2 pages.

PCT Search Report and Written Opinion in PCT/US2021/058503, dated Feb. 23, 2022, 15 pages.

Rampalli, et al., "Fusion of Complementary Online and Offline Strategies for Recognition of Handwritten Kannada Characters," available at http://mile.ee.fisc.ac.in/publications/softCopy/DocumentAnalysis/RAKESH_AGR_J.UCS.pdf, accessed on Mar. 21, 2022, version of paper in J.UCS, Journal of Universal Computer Science, vol. 17, No. 1, 2011, 13 pages.

He, et al., "Deep Residual Learning for Image Recognition," Cornell University arXiv library, arXiv:1512.03385v1 [cs.CV], Dec. 10, 2015, 12 pages.

PCT Search Report and Written Opinion for International Application No. PCT/US2021/061307, dated Mar. 23, 2022, 12 pages.

Zhang, et al., "Online and Offline Handwritten Chinese Character Recognition: A Comprehensive Study and New Benchmark," in Cornell University's arXiv repository, arXiv1606.05763v1 [cs.CV], preprint submitted to Pattern Recognition, Jun. 18, 2016, 21 pages.

Ronneberger, et al., "U-Net: Convolutional Networks for Biomedical Image Segmentation," Cornell University arXiv library, arXiv:1505.04597v1 [cs.CV], May 18, 2015, 8 pages.

Ye, et al., "Grouping Text Lines in Freeform Handwritten Notes," in Proceedings of the Eight International Conference on Document Analysis and Recognition, 2005, 5 pages.

Wang, et al., "Parsing Ink Annotations on Heterogeneous Documents," in Proceedings of the Third Eurographics Conference on Sketch-Based Interfaces and Modeling, Sep. 2006, 8 pages.

U.S. Appl. No. 17/117,149, filed Dec. 10, 2020.

* cited by examiner

OVERVIEW OF A PROCESS OF SELECTING ELEMENTS IN AN INK DOCUMENT 902

DISPLAY AN INK DOCUMENT ON A DISPLAY DEVICE BASED ON A DATA STRUCTURE HAVING A HIERARCHY OF NODES THAT DESCRIBES RESPECTIVE ELEMENTS IN THE INK DOCUMENT.
904

RECEIVE AN INPUT SIGNAL THAT INDICATES THAT THE USER HAS SELECTED AT LEAST ONE ELEMENT OF THE INK DOCUMENT USING AN INPUT DEVICE, THE ELEMENT(S) THAT IS SELECTED CORRESPONDING TO AN INITIAL SET OF SELECTED ELEMENTS.
906

IDENTIFY AT LEAST ONE NODE IN THE DATA STRUCTURE THAT IS ASSOCIATED WITH THE INITIAL SET OF SELECTED ELEMENTS, THE NODE(S) THAT IS IDENTIFIED CORRESPONDING TO A SET OF CURRENTLY-IDENTIFIED NODES, EACH NODE IN THE SET OF CURRENTLY-IDENTIFIED NODES CORRESPONDING TO AN INK OBJECT HAVING A SMALLEST SELECTABLE SEMANTIC SCOPE.
908

HIGHLIGHT A PART OF THE INK DOCUMENT DISPLAYED ON THE DISPLAY DEVICE THAT ENCOMPASSES THE SET OF SELECTED ELEMENTS, THE PART THAT IS HIGHLIGHTED CORRESPONDING TO A HIGHLIGHT ZONE.
910

OVERVIEW OF A PROCESS OF MODIFYING AN ORIGINAL DATA STRUCTURE 1102

RECEIVE AN ORIGINAL DATA STRUCTURE PRODUCED BY AN INK ANALYSIS ENGINE, THE ORIGINAL DATA STRUCTURE HAVING NODES THAT DESCRIBE RESPECTIVE ELEMENTS IN THE INK DOCUMENT.
1104

PRODUCE A MODIFIED DATA STRUCTURE THAT INCLUDES A HIERARCHY OF NODES, THE HIERARCHY OF NODES HAVING AN ARRANGEMENT OF NODES THAT DIFFERS FROM AN ORIGINAL ARRANGEMENT OF NODES IN THE ORIGINAL DATA STRUCTURE.
1106

FIG. 11

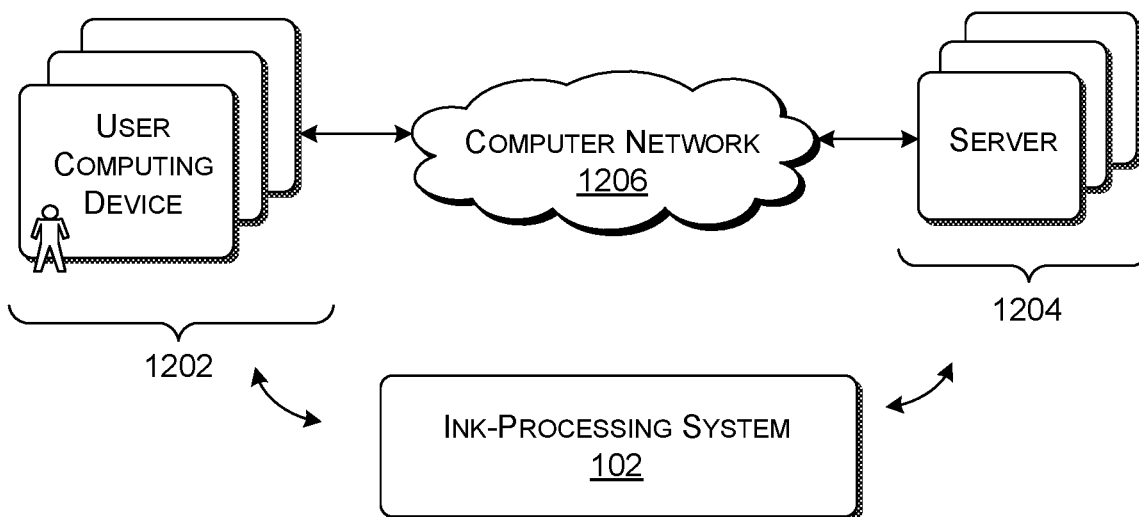

FIG. 12

SELECTING CONTENT IN INK DOCUMENTS USING A HIERARCHICAL DATA STRUCTURE

This application is a continuation of application Ser. No. 17/117,149 (the '149 application), filed on Dec. 10, 2020. The '149 application is incorporated by reference herein in its entirety.

BACKGROUND

A user can create an ink object (such as a line of text) by drawing on a digitizer's writing surface in a free-form manner using a writing implement of some kind, such as a pen or finger. This ink object can have an arbitrary size, writing style, and orientation with respect to other ink objects. The ink object can even run into other ink objects in the ink document, as when the user creates a doodle that merges into another drawing. This great freedom of expression may make it difficult for a user to later unambiguously specify the bounds of a region of interest within the ink document, e.g., for the purpose of selecting an element within the ink document.

Prior user interface solutions are designed to operate on conventional typewritten text documents. These solutions are not well suited for interacting with ink documents. For example, in one known solution, a text-processing application allows a user to tap on a word in a conventional typewritten text document. The text-processing application responds by highlighting the word in the text document. The user may then manually drag the boundaries of the highlighted region in the document so that the highlighted region encompasses a designated portion of the document. The user can perform this action using a mouse device or finger. However, an application cannot readily perform the same operation on an ink document due to its free-form nature. For instance, in an ink document, a specified starting point and ending point in the ink document may designate a window that includes many different types of content items mixed together in an arbitrary manner. The user may intend to select a particular content item within the window, but the application has no way of discerning the true target of the user's selection.

Two additional factors may compound the above challenges. First, a computing device may provide a relatively small display surface for presenting an ink document. In this case, it may be difficult for a user to accurately pinpoint the boundaries of a desired selection in the ink document. This may be particularly true for a user with large fingers. A pen offers better selection precision, but a pen is generally an ill-equipped tool to drag boundaries and other objects. Second, different computing devices and application providers may use different custom formats to internally represent ink strokes. This factor makes it difficult for a developer to provide a user interface mechanism that works with a wide range of ink document types.

SUMMARY

Technology is described herein for facilitating a user's interaction with a digital ink document. The technology internally represents an ink document presented on a display device using a data structure having a hierarchy of nodes that describe respective elements in the ink document. Upon the user's repeated selection of a particular part of the ink document, the technology traverses the data structure upward towards it root node. At each stage of the user's selection, a set identified nodes is defined by the user's current position within the hierarchy of nodes. The technique highlights a set of elements in the ink document that correspond to the set of currently-identified nodes.

According to another illustrative aspect, the technology produces the data structure by modifying an original data structure provided by an ink analysis engine, with the objective of accommodating structured interaction by the user with the ink document. The technology can perform this task by modifying the order of nodes in the original data structure, splitting original paragraph nodes into plural paragraph nodes, etc.

According to one technical characteristic, the solution presented herein allows a user to unambiguously and efficiently select a portion of an ink document. The solution can also be successfully applied to many types of computing devices having display surfaces of varying sizes and precisions. For instance, the solution performs its iterative selection routine even when the user's initial finger touch spans multiple ink objects. The solution can also be applied regardless of the format in which computing devices and applications represent ink strokes in memory.

The above-summarized technology can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 9 and 10 together form a flowchart that describes one illustrative manner of operation of the ink-processing system of FIG. 1.

FIG. 11 is a flowchart that shows a technique for converting an original data structure into a new, modified, data structure.

FIG. 12 shows illustrative computing equipment that can be used to implement the ink parsing system of FIG. 1.

Figure 1:
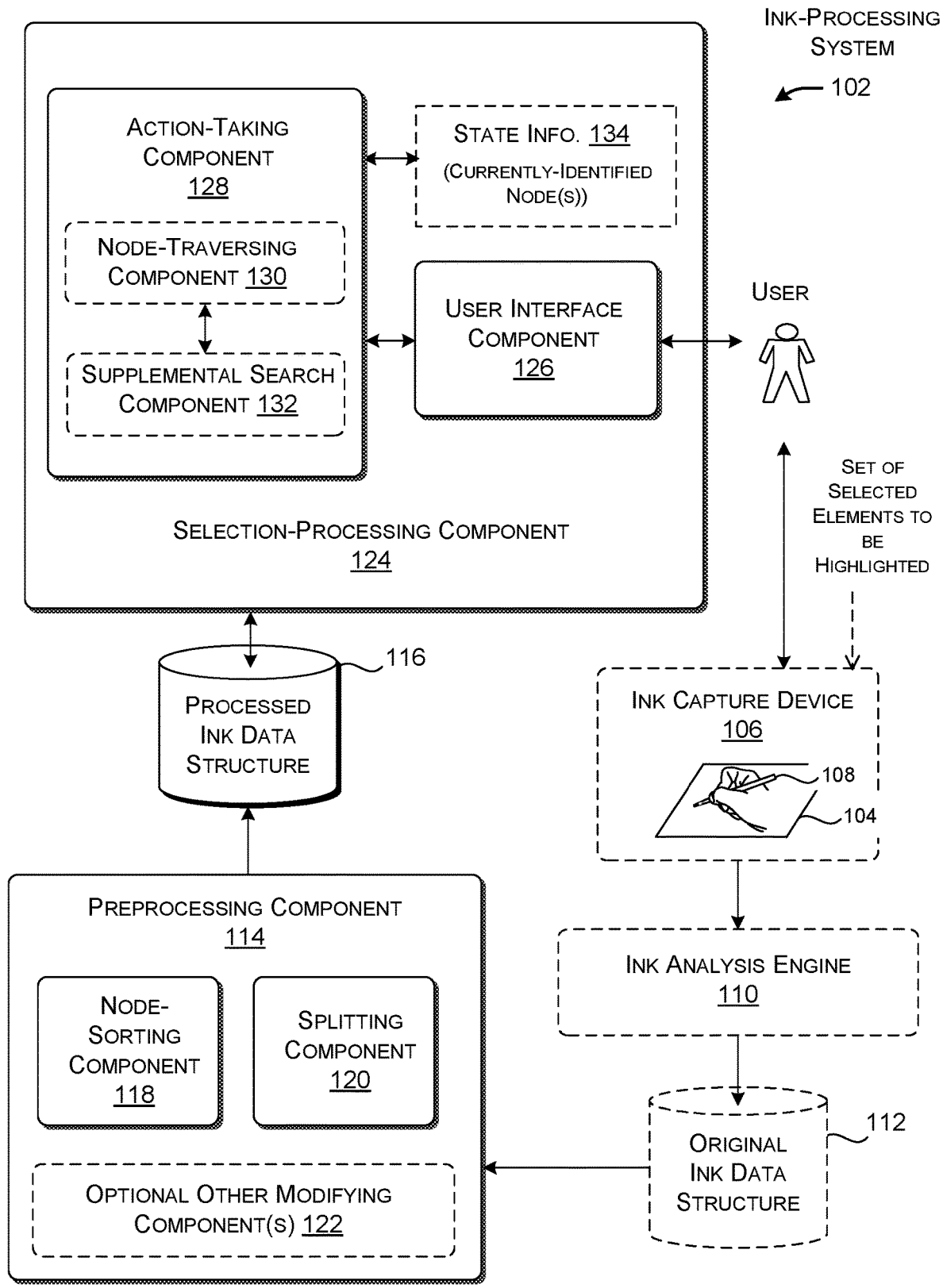
FIG. 1 shows an illustrative ink-processing system that enables a user to select a desired portion of a digital ink document.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes systems for processing a digital ink document. Section B sets forth illustrative methods which explain the operation of the systems of Section A. And Section C describes illustrative computing functionality that can be used to implement any aspect of the features described in Sections A and B.

As a preliminary matter, the term "hardware logic circuitry" corresponds to technology that includes one or more hardware processors (e.g., CPUs, GPUs, etc.) that execute machine-readable instructions stored in a memory, and/or one or more configurable gate units (e.g., FPGAs) that perform operations using a task-specific collection of fixed and/or programmable logic gates. Section C provides additional information regarding one implementation of the hardware logic circuitry. In some contexts, each of the terms "component," "module," "engine," "system," and "tool" refers to a part of the hardware logic circuitry that performs a particular function or combination of functions.

In one case, the illustrated separation of various parts in the figures into distinct units may reflect the use of corresponding distinct physical and tangible parts in an actual implementation. Alternatively, or in addition, any single part illustrated in the figures may be implemented by plural actual physical parts. Alternatively, or in addition, the depiction of any two or more separate parts in the figures may reflect different functions performed by a single actual physical part.

Other figures describe concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be implemented by the hardware logic circuitry described in Section C, which, in turn, can be implemented by one or more hardware processors and/or other logic units that include a task-specific collection of logic gates.

As to terminology, the phrase "configured to" encompasses various physical and tangible mechanisms for performing an identified operation. The mechanisms can be configured to perform an operation using the hardware logic circuitry of Section C. The term "logic" likewise encompasses various physical and tangible mechanisms for performing a task. For instance, each processing-related operation illustrated in the flowcharts corresponds to a logic component for performing that operation. A logic component can perform its operation using the hardware logic circuitry of Section C. When implemented by computing equipment, a logic component represents an electrical element that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se in transit, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Further, the term "plurality" refers to two or more items, and does not necessarily imply "all" items of a particular kind, unless otherwise explicitly specified. Further still, the descriptors "first," "second," "third," etc. are used to distinguish among different items, and do not imply an ordering among items, unless otherwise noted. Finally, the terms "exemplary" or "illustrative" refer to one implementation among potentially many implementations.

A. Illustrative Computing Systems

FIG. 1 shows an ink-processing system 102 for facilitating a user's interaction with ink strokes in an ink document. In the terminology used herein, a digital ink stroke (or "ink stroke" for brevity) refers to a sequence of digital data points created by a user as the user moves a writing implement across a writing surface 104 of an ink capture device 106. The writing implement may correspond to a pen 108, a finger, or some other tool. That is, each ink stroke begins when the user applies the writing implement to the writing surface 104 (corresponding to a pen-down event). Each ink stroke ends when the user disengages the writing implement from the writing surface 104 (corresponding to a pen-up event). In some implementations, a pen-down event corresponds to the case in which the user makes physical contact with the writing surface 104. In other cases a pen-down event corresponds to the case in which the user moves the writing implement to within a prescribed distance of the writing surface 104, but does not necessarily make physical contact with the writing surface 104.

A digital ink document (or "ink document" for brevity) refers to a document that is composed of one or more ink strokes. In some cases, an ink document is entirely composed of ink strokes. In other cases, an ink document can combine ink strokes with other content items that are not produced using the ink capture device 106, such as text composed of type characters (e.g., produced using a key input device or received from another source, etc.), images, etc.

In one implementation, the writing surface 104 includes a touch-sensitive display that uses a display device in combination with a digitizer. The display device may be co-extensive with the digitizer. Or the digitizer and the display device can overlap in part, but not in whole. In another implementation, the writing surface 104 corresponds to a digitizer that is separate from a display device. For example, the writing surface 104 may correspond to a digitizing pad that is physically separate from a display device on which the ink document is displayed. Still other implementations of the writing surface 104 are possible.

Without limitation, the display device can include a Liquid Crystal Display (LCD) device, an Organic Light-Emitting Diode (OLED) display device, an electronic paper display device (e.g., an electrophoretic display device, an electrowetting display device, etc.), a Cholesteric Liquid Crystal Display (ChLCD) device, a projection display device, and so on. The digitizer (not shown) detects the position of the pen 108 or other writing implement (such as a finger) on its surface. The digitizer can use any technology to perform this task. In some implementations, the digitizer includes an array of sensing elements arranged over its surface that detect the presence of the writing implement when placed in proximity thereto. More generally, the digitizer can us any technology or combination of technologies to detect the writing implement, including resistive, capacitive, electromagnetic, optical, and/or acoustic technology.

When it is used, the pen 108 may correspond to a passive pen (also known as a stylus) or an active digital pen. In some implementations, an active digital pen can perform various functions, such as transmitting electromagnetic signals that are detected by the digitizer's sensing elements when the pen is placed in proximity to the digitizer. In addition, or alternatively, the active digital pen can sense electrical signals that are transmitted by the digitizer. In addition, or alternatively, the active digital pen can sense the pressure with which the user applies the active pen to the writing surface 104. In addition, or alternatively, the active digital pen can transmit information that it collects to any destination device, such as the writing surface 104 itself.

The ink capture device 106 can record various data items that describe each ink stroke. For example, the ink capture device 106 can capture any combination of the following data items: a) an indication of a start and stop of the ink stroke, corresponding to pen-down and pen-up events; b) a series of position measurements, each position measurement describing the position of the writing implement on the writing surface 104 (e.g., by specifying x and y coordinates), or the change in position of the writing implement from a last-detected position (e.g., by specifying $\Delta x$ and $\Delta y$ measurements); c) a series of optional pressure measurements, each pressure measurement describing a pressure with which the user applies the writing implement to the writing surface 104; d) a series of time measurements, each time measurement describing a time at which a particular data point was captured, or the span of time since a last data point was captured (e.g., by specifying a $\Delta t$ value), and so on. Note, however, the ink-processing system 102 is agnostic with respect to the particular ink stroke data captured by a particular manifestation of the ink capture device 106. In other words, the ink-processing system 102 can work with any type of ink capture device 106 regardless of the way that the ink capture device 106 expresses ink strokes.

In some implementations, an ink analysis engine 110 parses the ink strokes in the ink document to generate preliminary information regarding the semantic objects encompassed by the ink document and the layout of those objects. The ink analysis engine 110 can use any technique(s) to perform this task. In one approach, the ink analysis engine 110 performs analysis on ink strokes in a pipeline of stages. The stages apply a bottom-up analysis approach, beginning with the analysis of individual ink strokes and then moving on to progressively larger semantic objects in the ink document. For example, in a first stage, the ink analysis engine 110 can classify each ink stroke based on any metadata pertaining to the ink stroke. This allows the ink analysis engine 110 to discriminate, for instance, whether an ink stroke likely belongs to a text object or a drawing object. (The terms ink "object" and ink "element" are used interchangeably herein.) In one or more subsequent stages, the ink analysis can cluster the ink strokes into progressively larger semantic units, e.g., by clustering ink strokes into characters, words, lines, paragraphs, etc. The ink analysis engine 110 can perform each clustering operation by defining a set of cost parameters that can be used to quantify what constitutes a good grouping, and then picking a candidate arrangement of elements that has a lowest net cost. For example, the ink analysis engine 110 can identify a text line by choosing the candidate arrangement of ink strokes that exhibits the lowest net deviation from a hypothetical fitting line. Background information regarding the general topic of ink document parsing can be found in Ming Ye, et al., "Grouping Text Lines in Freeform Handwritten Notes," Proceedings of the Eighth International Conference on Document Analysis and Recognition, 2005, pp. 367-371.

The above parsing approach is set forth here in the spirit of illustration, not limitation. Other techniques, for instance, can attempt to parse the ink document by analyzing the user's stream of ink strokes using a Hidden Markov Model (HMM), by using a Conditional Random Field (CRF) model, by using a machine-trained classification model of any type (such as a neural network, etc.), and so on. Further, different ink analysis engines 108 can parse ink documents using any environment-specific ontology of elements. For instance, in the examples presented herein, it will be assumed that the ink analysis engine 110 identifies a smallest semantic text object as a word. In other applications, however, the ink analysis engine 110 may identify the smallest semantic text object as a character.

The ink analysis engine 110 can express layout information in an original data structure and can store that data structure in a data store 112. The original data structure can specifically identify the types of ink objects discovered in the ink document and their hypothesized organization within the ink document. Nevertheless, the original data structure may provide only a coarse estimate of the layout of an ink document, which, in some instances may be incorrect and/or unconcise. For example, an ink document may include two paragraphs located on either side of a drawing element. But the original data structure may indicate that the ink document likely includes a single paragraph next to a drawing. This failure may ensue, in part, from the complexity of the ink document. A user may create the objects of an ink object in a free-form and ad hoc manner, making it difficult for the ink analysis engine 110 to correctly identify the correct arrangement of its parts.

An optional preprocessing component 114 modifies the original data structure to produce a modified data structure, which it stores in a data store 116. Generally, the preprocessing component 114 performs this modification with the aim of facilitating a user's structured interaction with the modified data structure. The specific manner in which the preprocessing component 114 performs this task will be set forth below in the context of the explanation of FIG. 4. By way of overview, a node-sorting component 118 can reorder at least some of the nodes in the original data structure, to produce a new order of these nodes in the modified data structure. A splitting component 120 can split a paragraph node specified in the original data structure into two or more derivative paragraph nodes in various circumstances described below. FIG. 1 also indicates that the preprocessing component 114 can include any other component(s) 122 for modifying the original data structure in any other environment-specific way(s).

An illustrative sample of a modified data structure will be set forth below in the context of the explanation of FIG. 3. By way of introduction, the modified data structure includes a hierarchy of nodes. The modified data structure organizes these nodes in a manner which better conforms to the visual layout of the elements in the ink document, compared to the original data structure stored in the data store 112.

A selection-processing component 124 handles a user's input actions directed to the ink document. More specifically, a user interface component 126 provides logic for displaying the ink document on a display device. The user interface component 126 also provides logic for processing input signals received from the digitizer of the writing surface 104. The input signals may indicate that the user has selected an element of the ink document with some type of writing implement, or performed some other action directed to the element.

An action-taking component 128 performs an appropriate action in response to a user's selection of an element in the ink document. The action-taking component 128 can include at least two sub-components: a node-traversing component 130 for performing a node-traversing routine; and a supplemental search component 132 for performing a supplemental search routine. For example, upon the user's first selection of the element using a pen, finger, or other writing implement, the node-traversing component 130 can identify a corresponding selected node in the modified data structure. The node-traversing component 130 can then instruct the user interface component 126 to highlight the element on the display device, to produce a selection zone. Upon the user's next selection of any point in the selection zone, the node-traversing component 130 can traverse the modified data structure's hierarchy of nodes to find a parent node associated with the selected node. The node-traversing component 130 can then instruct the user interface component 126 to highlight a set of elements in the ink document corresponding to the parent node and all children of the parent node. The node-traversing component 130 repeats this operation each time the user selects the same element in the ink structure until the action-taking component 128 reaches the root node of the hierarchy of nodes.

The supplemental search component 132 will be explained more fully below with reference to FIGS. 7 and 8. By way of introduction, the supplemental search component 132 searches one or more spatial search regions in the ink document for the presence of supplemental elements to be highlighted, along with any elements identified by the node-traversing component 130. These supplemental elements are referred to as "supplemental" because they have a spatial relation to one or more already-selected elements identified by the node-traversing component 130, but are not themselves necessarily discovered by the node-traversing component 130.

The action-taking component 128 can store state information 134 in memory that allows it to perform the above functions. In some implementations, the state information 134 identifies the particular element(s) (and corresponding node(s) in the modified data structure) that the user has selected. In addition, or alternatively, the state information 134 can store information regarding how many times the user has selected a selection zone within a same cohesive selection operation. In addition, or alternatively, the state information 134 can identify a top-level node (or nodes) that the user has reached in the hierarchy of nodes in the course of a particular selection operation. In addition, or alternatively, the state information can describe a set of currently-identified nodes, a set of selected elements to be highlighted, and scope of a resultant selection zone that encompasses the set of selected elements.

In some implementations, a single computing device implements all the components shown in FIG. 1, including the ink capture device 106. In another implementation, a first computing device implements the ink capture device 106, the ink analysis engine 110, and the data store 112, while a second computing device implements the preprocessing component 114, the data store 116, and the selection-processing component 124. This latter case is appropriate for the situation in which a user receives a pre-existing ink document that he or she may or may not have created. For example, the user can use a second computing device to interact with an ink document created by a friend using a first computing device.

Figure 2:
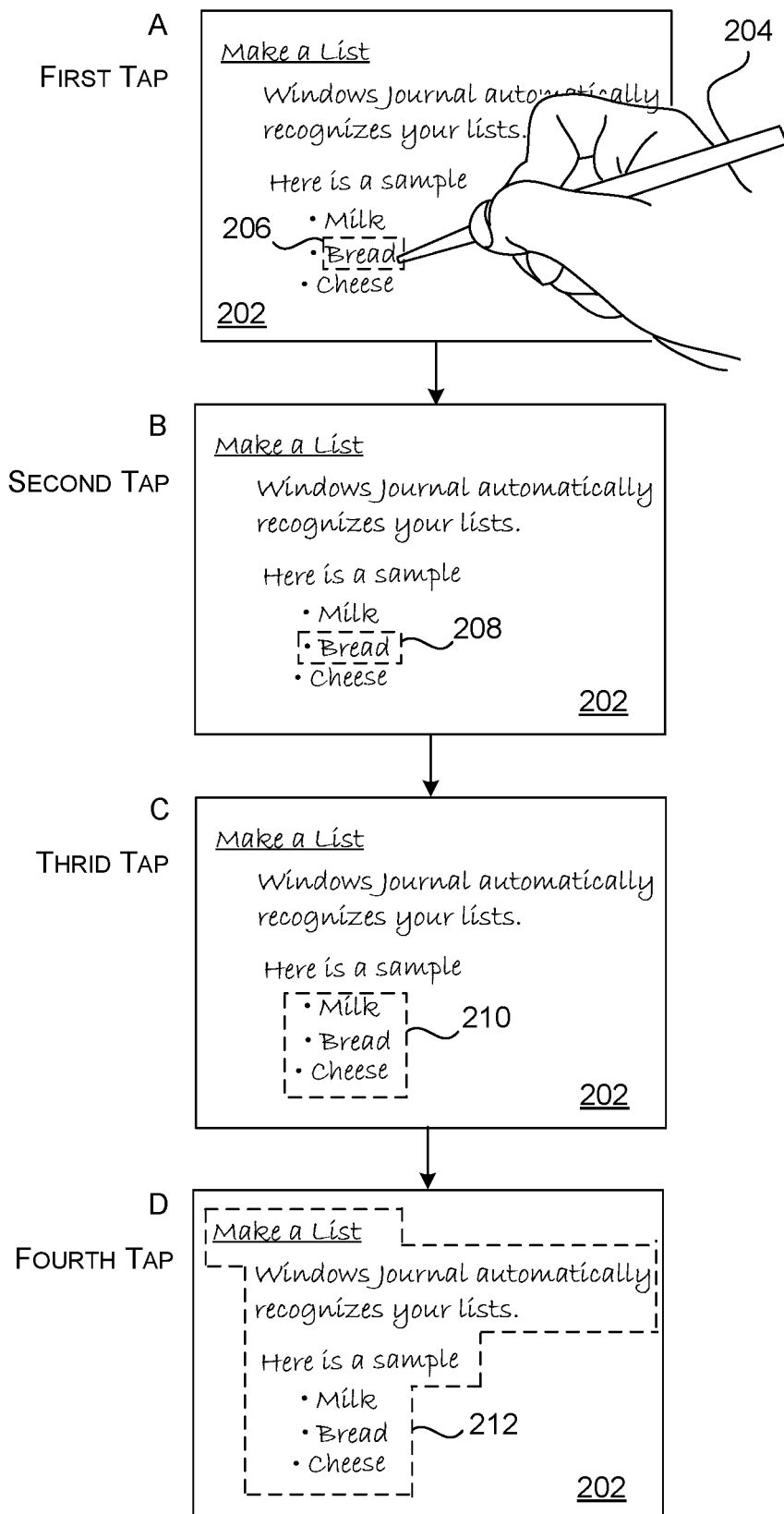
FIG. 2 shows an example of the operation of the ink-processing system of FIG. 1.

FIG. 2 shows an example of the operation of the selection-processing component 124, in which the user interacts with a simplified ink document 202. More specifically, FIG. 2 will primarily explain the operation of the node-traversing component 130. This figure will also be explained in conjunction with a modified data structure 302 shown in FIG. 3. The modified data structure 302 provides a simplified example of a hierarchy of nodes that describe the content and layout of the ink document 202. In this example, assume that the user interacts with the ink document 202 using a pen 204, although the user can use any other writing implement to interact with the ink document 202, such as a finger.

In a stage A, assume that the user selects a particular element (the word "Bread") in a list within the ink document 202, e.g., by tapping on the word with the pen 204. In response, the user interface component 126 of the selection-processing component 124 identifies a corresponding node 304 in its hierarchy of nodes. The selection-processing component 124 then displays a selection zone 206 that highlights the selected element (the word "Bread") in the ink document 202. Note that the node 304 that is identified can be viewed as the smallest semantic object that is associated with the user's selection. In other words, the word "Bread" occurs within a particular line, and that line occurs within a particular list. But the selection-processing component 124 identifies the particular node 304 because this node maps to the smallest semantic object that the user can be said to have selected. In many cases, a node associated with the smallest semantic object will correspond to the lowest node in the hierarchy of nodes that the user can be said to have selected. Other applications can define what constitutes a smallest selectable unit in other respective ways. The user interface component 126 can map the user's initial selection to a selected element (or elements) using any environment-specific logic, such as by determining whether a point (or points) of the user' selection are enclosed (or mostly enclosed) in a bounding box or other envelope associated with a particular unit of selectable content.

In stage B, assume that the user again taps on the particular element (the word "Bread") in the ink document 202. Or assume that the user selects a point located anywhere else in the selection zone 206. In response, the selection-processing component 124 ascends the hierarchy of nodes to discover a parent node 306 of the word "Bread." The parent node 306 has two child nodes: the node 304 for the word "Bread" and a node 308 for a bullet point that immediately precedes the word "Bread" in the ink document 202. The selection-processing component 124 then updates a selection zone 208 on the display device so that it encompasses both the word "Bread" and its associated bullet point. More generally, upon any selection, the selection-processing component 124 updates a set of currently-identified nodes. It also updates a corresponding set of selected elements to be highlighted in a selection zone in the ink document.

In step C, assume that the user taps on the word "Bread" in the ink document 202 a third time. Or assume that the user taps on some other point in the selection zone 208. In response, the selection-processing component 124 ascends the hierarchy of nodes to discover a parent node 310 of the second line in the list. The parent node 310 designates the list as a whole, including each of its three lines. The selection-processing component 124 then updates a selection zone 210 on the display device so that it encompasses the entire list. The set of currently-identified nodes now includes node 310 and all its child nodes. The set of selected elements, similarly, now includes the entire list.

In step D, assume that the user taps on the word "Bread" (or some other point in the selection zone 210) in the ink document 202 a fourth time. In response, the selection-processing component 124 ascends the hierarchy of nodes to finally discover a root node 312 of the hierarchy. The root node 312 designates the ink document 202 as a whole, including all of its ink objects. The selection-processing component 124 then updates a selection zone 212 on the display device so that it encompasses the entire ink document 202. In general, note that the selection-processing component 124 can expand the selection zone in the input document 202 in a structured and coherent manner because the preprocessing component 114 has arranged the nodes in the modified data structure such that the nodes conform as best as possible to the visual layout of elements in the ink document 202.

Figure 3:
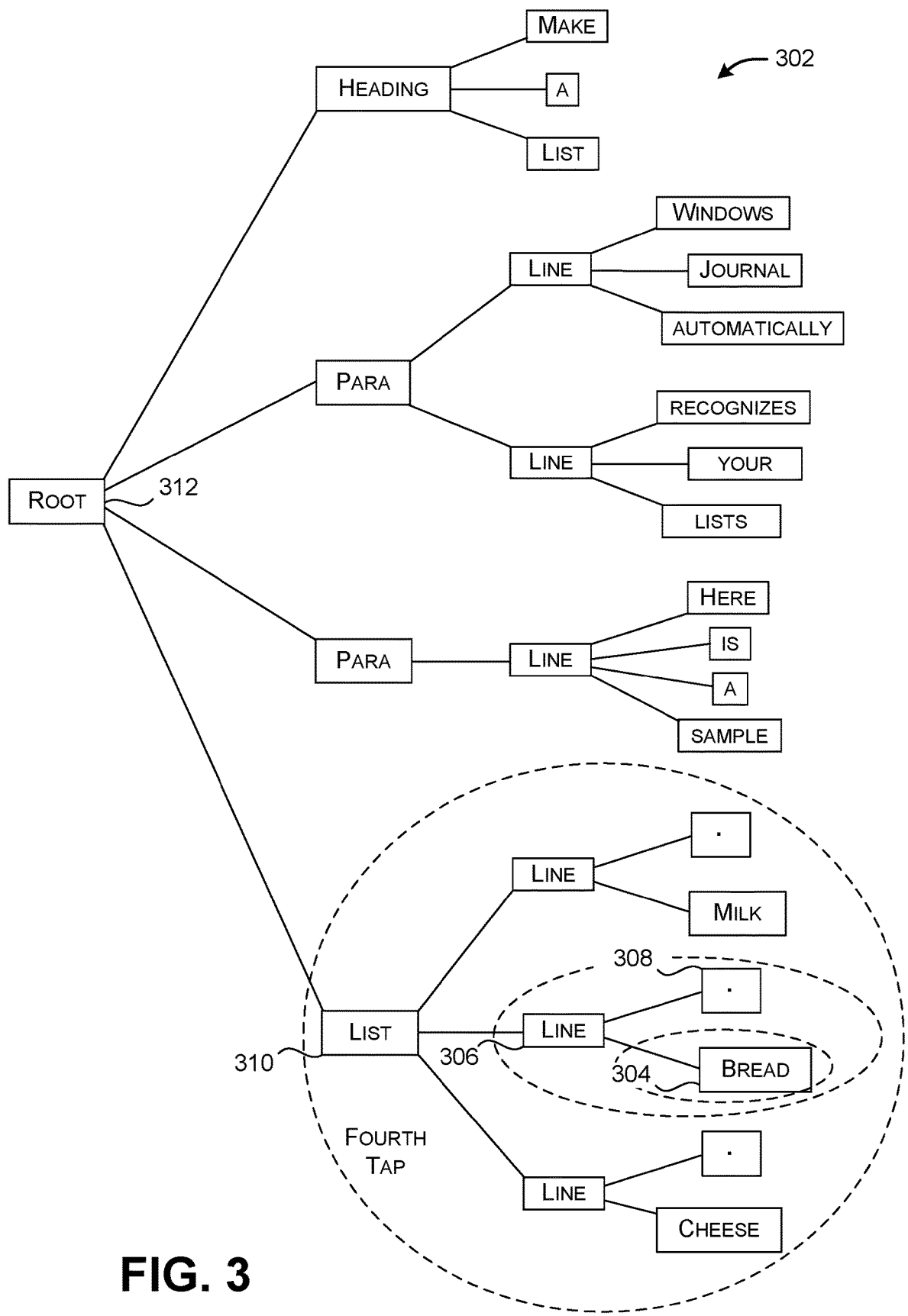
FIG. 3 shows a hierarchy of nodes that the ink-processing system of FIG. 1 can use to represent an ink document.

Although not shown in FIG. 3, the data structure 302 can include non-ink nodes associated with non-ink elements in the ink document, such as images. Further, these non-ink nodes participate in the above-described selection routine in the same manner as ink nodes. For example, if the ink document 202 contains an image (not shown), the selection-processing component 124 would add it to the selection zone 212 in stage D, along with the other elements of the ink document 202.

Figure 4:
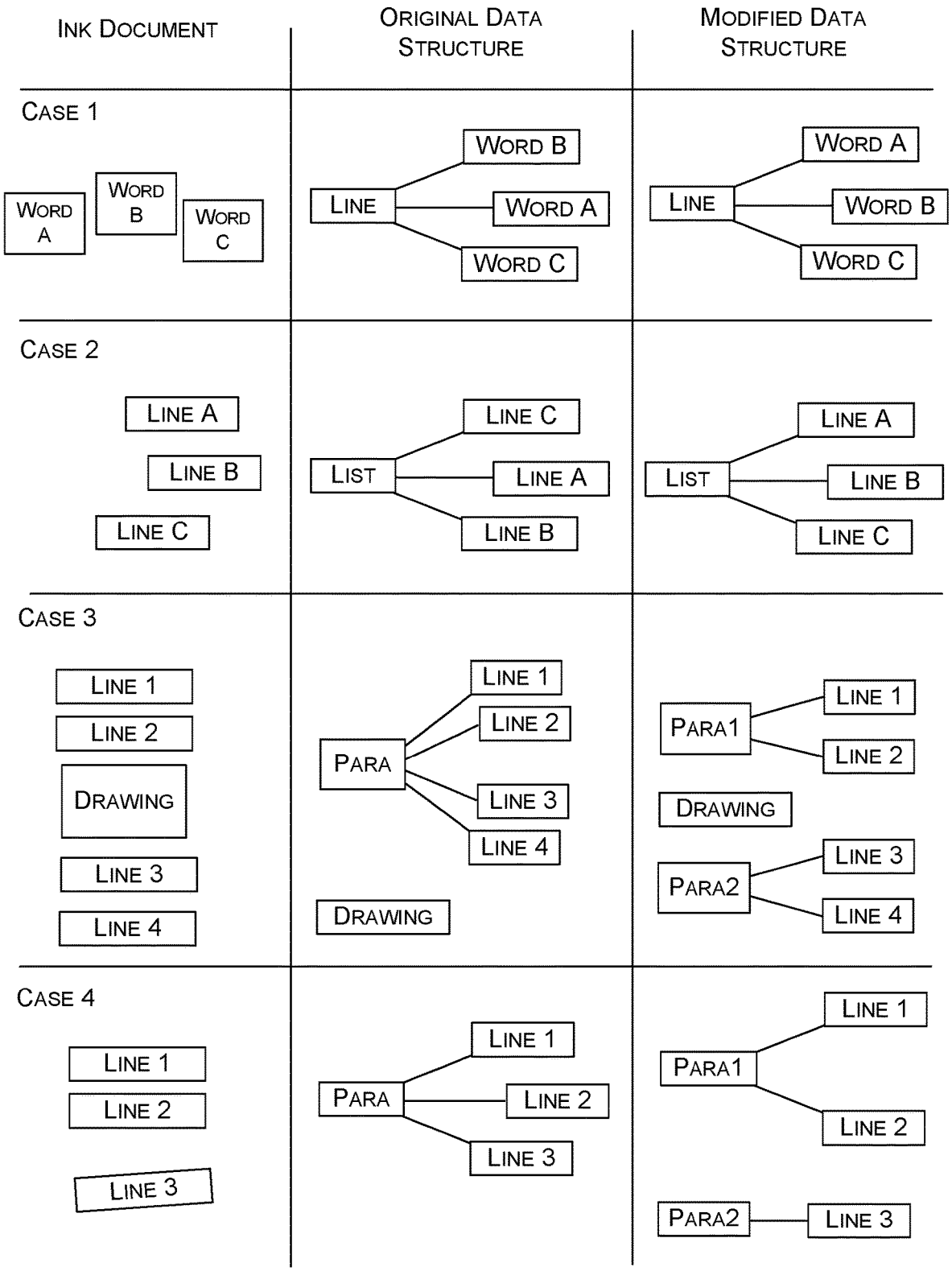
FIG. 4 shows illustrative rules that the ink-processing system of FIG. 1 can use to transform an original data structure into a new, modified, data structure.

FIG. 4 shows illustrative rules that may be applied by the preprocessing component 114 to transform the original data structure into the modified data structure. More specifically, a first (left-most) column of FIG. 4 shows an illustrative snippet of an ink document, showing the visual layout of a collection of elements on a display screen. A second (middle) column of FIG. 4 shows an illustrative organization of nodes in the original data structure. A third (right-most) column of FIG. 4 shows an illustrative restructuring of nodes in the modified data structure performed by the preprocessing component 114.

In a first processing algorithm, the node-sorting component 118 of the preprocessing component 114 performs analysis on parent nodes in the hierarchy of nodes in the original data structure, starting with the root node of the hierarchy of nodes and then moving progressing down toward the leaf nodes. A parent node is any node that has one or more child nodes. Upon discovering a parent node, the node-sorting component 118 first determines the type of element it represents, such as a line, a paragraph, a list, etc. Lines have children that should flow horizontally from left to right (in some languages), while paragraphs and lists have children that should flow vertically from top to bottom. The node-sorting component 118 then examines the ink document itself to determine the visual order of appearance of the elements, corresponding to the child nodes in the ink document. It then reorders the nodes in the original data structure to conform to the visual order.

More specifically, for the case of horizontally flowing child elements, the node-sorting component 118 first sorts the corresponding nodes based on the left-most coordinates of their child elements' bounding boxes in the ink document. If there are any elements that have the same left-most coordinate, then the node-sorting component 118 sorts them by their top-most coordinates. For the case of vertically flowing child elements, the node-sorting component 118 first sorts the corresponding nodes based on the top-most coordinates of their child elements' bounding boxes. If there are any elements that have the same top-most coordinate, then the node-sorting component 118 sorts them by their left-most coordinates.

Note that an incorrect order of sibling nodes may not negatively affect the selection routine described above with reference to FIG. 2. But an incorrect order may interfere with other functions that the ink-processing system 102 and/or a downstream application may perform. For example, consider the case in which the ink-processing system 102 hosts a module (not shown) that exports text extracted from an ink document and sends it to a downstream application upon request. This module will deliver text in an incorrect order in those instances in which the order of nodes in the data structure is incorrect.

For example, in Case 1 shown in FIG. 4, the ink document includes a line element that is made up of three word elements. Assume that the line element is associated with a particular node in the original data structure. By definition, a line node has children that should horizontally flow from left to right in many languages. But assume that the ink analysis engine 110 incorrectly interprets the word B as the first element of the line because it occurs slightly above the two other elements in the ink document. As a further result, the ink analysis engine 110 produces a sequence of child nodes that includes word B as the first-occurring node (as shown in the second column of Case 1). In response to this finding, the node-sorting component 118 reorders the nodes in a modified data structure to adopt the correct order, e.g., by including element A as the first-occurring child node (as shown in the third column of Case 1).

In Case 2 shown in FIG. 4, the ink document includes a list element that is made up of three line elements. The list element, in turn, is associated with a particular node in the original data structure. By definition, a list node has children that should vertically flow from top to bottom. But assume that the ink analysis engine 110 incorrectly interprets element C as the first-occurring element because it is farthest to the left among the three elements. As a further result, the ink analysis engine 110 produces a sequence of child nodes that includes line C as the first-occurring node (as shown in the second column of Case 2). In response to this finding, the node-sorting component 118 orders the nodes in the modified data structure in the correct order, e.g., such that node A is the first-occurring node (as shown in the third column of Case 2).

In a second processing algorithm, the splitting component 120 of the preprocessing component 114 identifies each paragraph P in an ink document and its corresponding node in the original data structure. The algorithm then checks if there is a non-text element E that is enclosed within the vertical span of the paragraph P, meaning that a top node of the element E is below a top node of the paragraph P, and a bottom node of the element E is above a bottom node of the paragraph P. If this is the case, the algorithm splits the original paragraph node into at least two paragraph nodes. A first paragraph node corresponds to a paragraph portion that lies above the non-text element E, while a second paragraph node corresponds to a paragraph portion that lies below the non-text element E. The second processing algorithm can repeat this splitting operation for any subsequent non-text element that is placed within the vertical span of the bottom-most paragraph portion.

For example, in Case 3, the ink document includes four lines that are originally assigned to the same single paragraph node in the original data structure. Those lines, however, are broken up by a drawing element that appears between the second and third lines. In response to this finding, the splitting component 120 can create two paragraph nodes in the modified data structure, each having two line nodes.

In a third processing algorithm, the splitting component 120 examines each paragraph P in the ink document from top to bottom. If it encounters any pair of neighboring lines that are farther apart than a prescribed threshold value, then the splitting component 120 represents the paragraph P in the modified data structure with two paragraph nodes, effectively treating the original paragraph as two new paragraphs (P1, P2). The splitting component 120 can repeat the above algorithm on the second new paragraph P2, starting its analysis with the first line of the second new paragraph P2. This process continues until the algorithm reaches the last line of the original paragraph P.

For example, in a Case 4 shown in FIG. 4, assume that the ink document includes three lines, and that the original data structure interprets these three lines as a single paragraph associated with a single paragraph node. Further assume that the second and third lines are separated by more than a prescribed distance. In response to this finding, the splitting component 120 produces two paragraph nodes in the modified data structure, the first composed of the first two lines, and the second including just the third line.

Consider the following example that clarifies the utility of the preprocessing component 114. Assume that the modified data structure does not correct the original data structure for the set elements shown in Case 3 (in which a drawing appears between two paragraphs). Further assume that the user double-taps on or otherwise selects Line 1 of the first paragraph. The selection-processing component 124 will highlight all four lines in the ink document because it interprets all four lines as part of a single paragraph. After the modification described above has been performed, however, the selection-processing component 124 will only highlight the first two-line paragraph.

Figure 5:
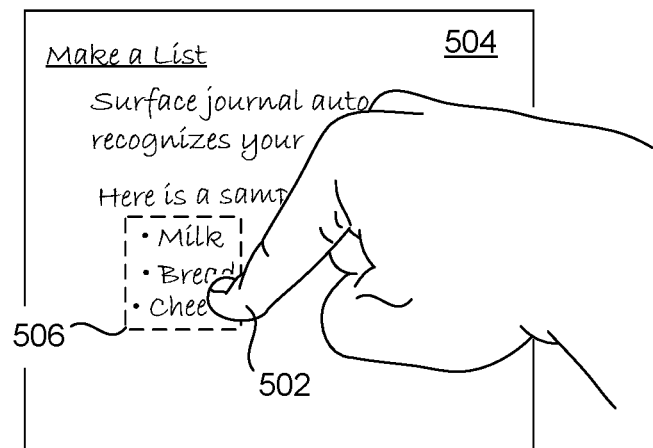
FIGS. 5 and 6 show examples of the possible operation of the ink-processing system of FIG. 1 when the user's touch encompasses two or more elements in the ink document.

FIG. 5 shows the behavior of the selection-processing component 124 for a case in which the user's writing implement (here, the user's finger 502) spans two or more elements in an ink document 504. For example, the user's finger 502 in this case touches both the words "Bread" and "Cheese" in a list element. In response, the selection-processing component 124 identifies the two nodes in the hierarchy of nodes that are associated with the two selected elements. These nodes are the smallest semantic objects that are directly implicated by the user's selection. The selection-processing component 124 then moves up the hierarchy of nodes in the modified data structure to identify the first-encountered common ancestor of the selected elements. Here, the first-encountered common ancestor is a list node.

At this stage, the set of currently-identified nodes includes all of the nodes associated with the list node, and the set of selected elements includes all of the elements in the list. The selection-processing component 124 then produces a selection zone 506 that highlights all of the selected elements, corresponding to all of the lines in the list. The selection-processing component 124 performs the same behavior described above with reference to FIG. 2 if the user again selects the selection zone 506, e.g., by moving farther up in the hierarchy of nodes and expanding the set of currently-identified nodes, the corresponding set of selected elements, and the resultant selection zone accordingly.

Figure 6:
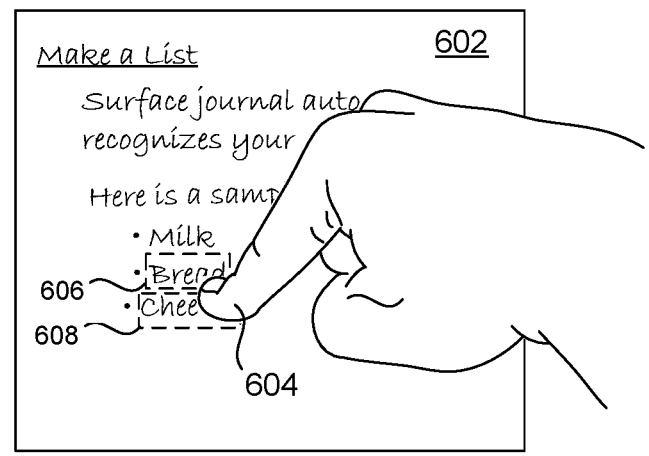

FIG. 6 shows an example of alternative behavior of the selection-processing component 124 for a case in which the user's touch spans two or more elements in an ink document 602. Again assume that the user's fingertip 604 spans the words "Bread" and "Cheese" in a list. In response to this selection, the selection-processing component 124 again identifies the two nodes in the hierarchy that are associated with the two selected elements, where those two nodes pertain to the smallest semantic objects that are implicated by the user's selection. The selection-processing component 124 then highlights the words "Bread" and "Cheese" in the ink document 602 using a selection zone that includes two selection sub-zones (606, 608). In other words, the example of FIG. 6 differs from the example of FIG. 5 because the selection-processing component 124 does not immediately advance to a common ancestor node upon the user's initial selection of two or more elements in the ink document.

Next assume that the user again touches both the word "Bread" and "Cheese" at the same time. In response, the selection-processing component will perform the same behavior described with respect to FIG. 2 in parallel, once for the word "Bread" and the second with respect to the word "Cheese"). The first action will prompt the selection-processing component 124 to follow a first path through the hierarchy of nodes to identify the line associated with the word "Bread," which, in turn, will result in the expansion of a first selection zone 606 to encompass the word "Bread" and its bullet point. The second action will cause the selection-processing component 124 to follow a second path through the hierarchy of nodes to identify the line associated with the word "Cheese," which, in turn will result in the expansion of a second selection zone 608 to encompass the word "Cheese" and its bullet point. These two paths respectively commence from the "Bread" and "Cheese" leaf nodes of the hierarchy. Upon the user's simultaneous selection of "Bread" and "Cheese" once more, the selection-processing component 124 will discover that the two paths converge at the list node, which is the common ancestor to the "Bread" node and the "Cheese" node. Thereafter, the behavior of the selection-processing component 124 is the same as the implementation explained above with reference to FIG. 5.

The user's subsequent selection may alternatively target just the word "Bread," or just the word "Cheese," but not both elements. In response, the selection-processing component 124 will traverse only a single path through the hierarchy, that is, without expanding the set of currently-identified nodes to include any new nodes from the other path.

FIGS. 5 and 6 show the case in which a user's touch spans two or more elements. More generally, the selection-processing component 124 can perform the above-described operations when the user simultaneously selects two or more elements in any manner. For example, in another case, the user selects two elements using two fingers of the same hand and/or different hands. In another case, a user simultaneously selects two or more elements by pressing a portion of his or her palm onto the writing surface 104, etc.

Figure 7:
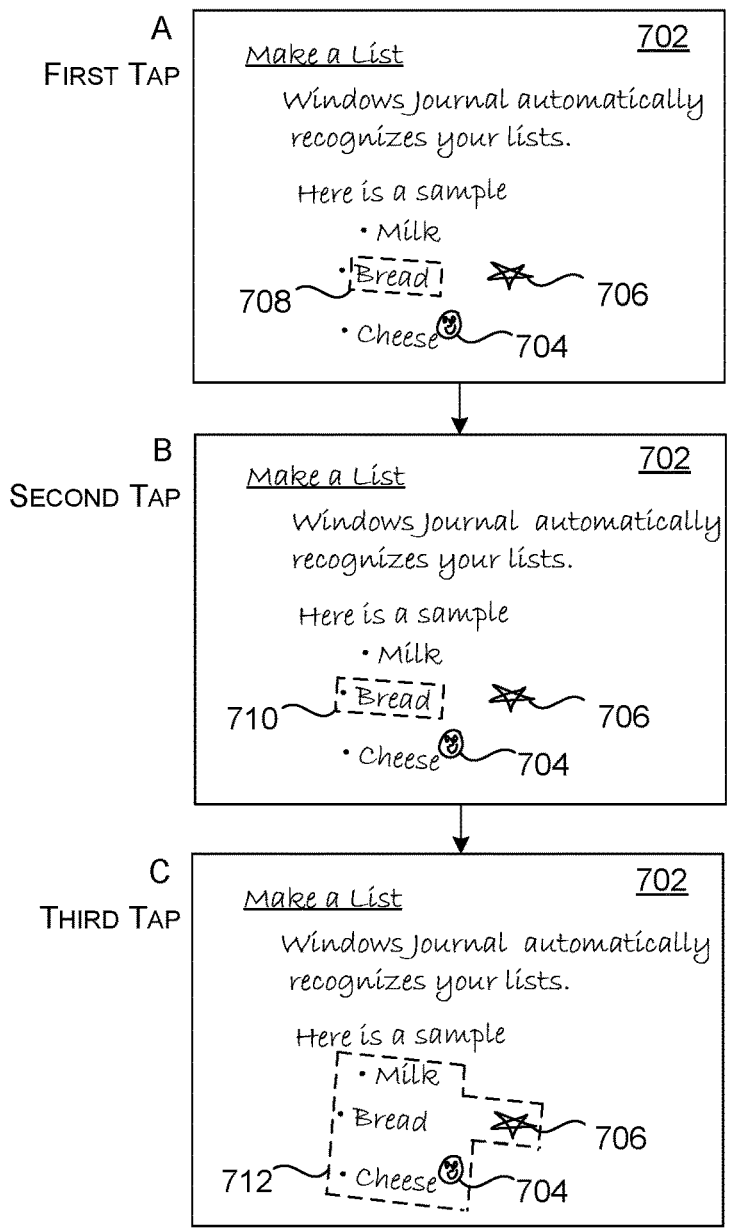
FIG. 7 shows an example in which the ink-processing system of FIG. 1 allows a user to identify one or more supplemental elements in an ink document based on a spatial relationship between the supplemental element(s) and a currently-selected set of elements that have been identified by traversing a data structure.
Figure 8:
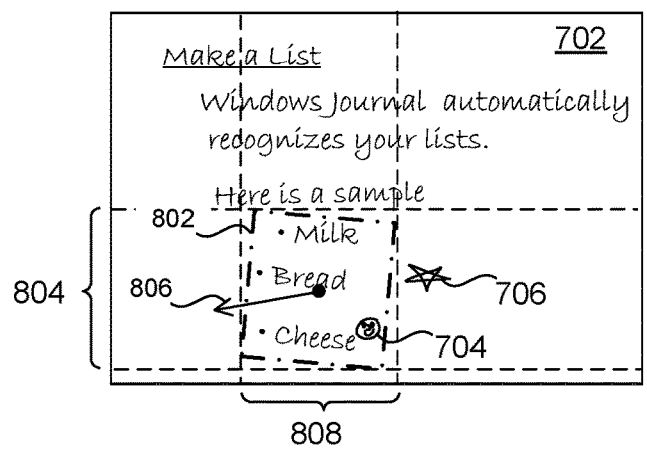
FIG. 8 shows one technique by which the ink-processing system can identify the supplemental element(s) shown in FIG. 7.

FIG. 7 shows an example that explains the operation of the supplemental search component 132, introduced above with reference to FIG. 1. In this example, assume that an ink document 702 includes a list element having three lines. Assume that the user has added a smiley-face drawing element 704 and a star-shaped drawing element 706 near the list element, e.g., to draw attention to one or more items in the list element. While the creator of the ink document 702 intended to create an ink document in which there is some semantic relation between the drawing elements (704, 706) and the list element, in some implementations, the modified data structure may not explicitly reflect this relationship. That is, in some implementations, the modified data structure may only link the list node to the drawing nodes through the common root node. If this is the case, the above-described hierarchy-traversing routine will not highlight the drawing elements (704, 706) when the user successively clicks on the list element, until the routine reaches the root node of the hierarchy of nodes.

FIG. 7 shows the operation of a modified algorithm performed by the supplemental search component 132 that will reveal the relationship between the list element and the drawing elements (704, 706) at an appropriate juncture. In stage A, assume that the user has tapped on the word "Bread" with a finger or pen. The node-traversing component 130 responds by identifying a node associated with the word "Bread" in the modified data structure, and then highlighting the word "Bread" in the ink document 702 in a selection zone 708. At this stage, the set of currently-identified nodes includes just the "Bread" node, and the set of selected elements includes just the "Bread" element.

In stage B, assume that the user selects any point in the selection zone 708. The node-traversing component 130 will respond by moving up one level from the "Bread" node in the hierarchy to identify a line node in the hierarchy. The line node encompasses the "Bread" node and its bullet point. The node-traversing component 130 adds the line node and its children to the set of currently-identified nodes, and updates the set of selected elements to include the "Bread" node and its bullet point. The node-traversing component 130 then displays an updated selection zone 710 that includes the set of selected elements.

In stage C, assume that the user selects any point in the selection zone 710. The node-traversing component 130 will respond by moving up one level from the "Bread" line node to identify a list node that encompasses all of the line nodes of the list element. In response, the node-traversing component 130 adds all the newly-identified nodes to the set of currently-identified nodes, and all the newly-identified elements to the set of selected elements.

At this juncture, the selection-processing component 124 invokes the supplemental search component 132 to perform a supplemental search operation. This operation involves examining a region in the ink document 702 in a prescribed vicinity of the list element. In this case, it will find the drawing elements (704, 706). The supplemental search component 132 then adds the nodes of these elements to the set of currently-identified nodes. It will also add the new drawing elements (704, 706) to the set of selected elements. The selection-processing component 124 then presents a selection zone 712 that encompasses the list element and the drawing elements (704, 706). The drawing elements (704, 706) may be considered supplemental elements in the sense that they are discovered through a process other than the tree-traversal technique performed by the node-traversing component 130.

Although not shown, upon the user's subsequent selection of the selection zone 712, the node-traversing component 130 will advance to the root node of the hierarchy. The node-traversing component 130 will then add all of the nodes of the hierarchy to the set of currently-identified nodes. The selection-processing component 124 will also highlight the entire document in an updated selection zone (not shown).

The selection-processing component 124 can produce the behavior shown in FIG. 7 in different ways. FIG. 8 will be used to describe merely one technique that the supplemental search component 132 can use to identify the drawing elements (704, 706). Here, the supplemental search component 132 is triggered to perform a supplemental search routine when the set of currently-selected nodes grows to include the list node. In other words, the selection-processing component 124 invokes the supplemental search component 132 when a highest-identified node reaches at least the list node in the hierarchy. The supplemental search component 132 will then determine whether a bounding enclosure 802 that is drawn around the list element in the ink document 702 includes any additional elements that are not part of the list element per se. The supplemental search component 132 discovers the presence of the smiley-face drawing element 704 within the bounding enclosure 802. The supplemental search component 132 optionally also examines a slice 804 of the ink document 702 that extends horizontally across the ink document 702, and which vertically extends from a top-most coordinate of the list element to a bottom-most coordinate of the list element. The supplemental search component 132 discovers the presence of the star-shaped drawing element 706 in this region. Note that both of the bounding enclosure 802 and the horizontal slice 806 can be regarded as spatial search regions.

The supplemental search component 132 can vary the above-described supplemental search routine in at least three respects: (1) when the routine is invoked; (2) how the routine defines its spatial search region(s); and (3) how the routine decides what elements to include in the set of selected elements. With respect to the first issue, the selection-processing component 122 invokes the supplemental search component 132 when its traversal of the hierarchy of nodes reaches certain kinds of nodes (e.g., list nodes, paragraph nodes, etc.), but not other nodes (e.g., line nodes). Alternatively, the selection-processing component 124 can invoke the supplemental search component 132 each time it moves up in the hierarchy of nodes, without regard to the kind of the top-most node that is reached. Indeed, the selection-processing component 124 can even invoke the supplemental search component 132 upon the user's very first selection. Alternatively, the selection-processing component 124 can determine when to invoke the supplement search routine based on different triggering events, such as the occurrence of any one of the plural triggering events, or a combination of plural triggering events that have occurred together.

Further note that, as described above, the supplemental search component 132 expands the selection zone 712 to include the complete list element and the drawing elements (704, 706) at the same time. In another implementation, the supplemental search component 132 can present a selection zone that only highlights the list element when the user performs the third tap. The supplemental search component 132 can wait until the user performs a fourth tap to discover the drawing elements (704, 706), and then adds these elements to the selection zone. In yet another variation, the supplemental search component 132 can search just the bounding enclosure 802 upon a fourth tap, which results in discovery of the smiley-face drawing element 704, and search just the horizontal slice 804 upon the user's fifth tap, which results in discovery of the star-shaped drawing element 706.

With respect to the second issue, the supplemental search component 132 described above creates a bounding enclosure 802 around a group of selected elements (e.g., including the elements which compose the list element). The supplemental search component 132 also examines a horizontal slice 804 which extends across the ink document 702 and which has a vertical span defined by the height of the list element. As said, these are two examples of spatial search regions. Alternatively, or in addition, the supplemental search component 132 can examine a spatial search region defined by a predetermined radius 806 that extends from a center of a group of selected elements. The center may correspond to a center of mass of the elements in the list element. Alternatively, or in addition, the supplemental search component 132 can examine a vertical slice 808 that extends across the ink document in a vertical direction, and which has a horizontal span defined by the width of the list element. Still other ways of defining a search region are possible.

With respect to the third issue, the above-described supplemental search routine decides to add the drawing elements (704, 706) to the set of already-selected elements (associated with the list element) because the drawing elements (704, 706) appear within (or mostly within) one or more of the above-described spatial search regions. In other implementations, the supplemental search component 132 can take into consideration any combination of factors in deciding whether to include a candidate supplemental element in a set of already-selected search elements. Without limitation, a non-exhaustive list of factors include: a) whether a prescribed amount of the candidate supplemental element is enclosed in one or more defined spatial search regions; b) the type(s) of the spatial search region(s) in which the candidate supplemental element appears; c) a spatial distance between the candidate supplemental element and the other selected element(s) (e.g., where the position of the other selected element(s) may be defined by a center of mass associated with those other selected element(s)); d) the semantic content of the supplemental element compared to the semantic content of the other selected element(s); e) the time at which the user created the candidate selected element compared to the time(s) at which the user created the other selected element(s); 0 a configuration setting defined by a user or other entity, etc. In one implementation, the supplemental search component 132 can compute a weighted score based on these factors. The supplemental search component 132 can conclude that a candidate supplemental element should be added to the other selected element(s) if the weighted score exceeds a prescribed threshold value. Or the supplemental search component 132 can use a machine-trained model to map a feature vector that expresses any combination of the above factors to an output conclusion that indicates whether the candidate selected element should be added to the other selected element(s). As an overriding objective, the supplemental search component 132 will add the candidate supplement element with the aim of guiding the user's later structured selection of parts of the ink document 702. Two elements are good candidates to be linked together if it is likely that the user may wish to form a selection zone that encompasses both elements. As noted above, this type of relationship is "supplemental" or "lateral" insofar as it reflects a link that may not be conveyed by the modified data structure.

In the above-described technique, the supplemental search component 132 discovers the supplement element(s) in the course of the user's traversal of the hierarchy of nodes. Alternatively, or in addition, as a preliminary operation, the preprocessing component 114 can add supplemental links to the modified data structure that reflect, for instance, the kinds of supplemental relations between the list element and drawing elements (704, 706). The node-traversing component 130 will then follow these supplemental links as part of the algorithm set forth above with reference to FIG. 2.

In yet another variation, the selection-processing component 124 can integrate the operation of the supplemental search component 132 on a more pervasive manner compared to that described above. In one alternative approach, for instance, the selection-processing component 124 can operate by: a) using the node-traversing component 130 to detect a user's initial selection of at least one element in the ink document; b) using the node-traversing component 130 to identify the node(s) associated with the user's selection, to provide a set of currently-identified nodes; c) presenting a selection zone on the ink document that encompasses a set of selected elements associated with the set of currently-identified nodes; d) using the supplemental search component 132 to draw a bounding enclosure around the selected elements; e) receiving the user's selection on the selection zone; f) in response to the user's selection, using the supplemental search component 132 to expand the bounding enclosure by a prescribed amount; g) using the node-traversing component 130 to identify any new elements encompassed by the expanded bounding enclosure and the nodes associated therewith; h) adding those nodes to the currently-identified set of nodes; and i) repeating operations (d) through (h) any number of times.

In conclusion to Section A, the ink-processing system 102 described herein has a number of technical merits. For instance, the ink-processing system 102 allows a user to efficiently and accurately select content items within an ink document, even if the ink document is relatively complex, and even if the original data structure that describes the ink document does not fully and/or accurately describe its visual layout. The ink-processing system 102 specifically eliminates the need for the user to perform drag operations to establish the bounds of a selection, which may be impossible or cumbersome for the user to perform on an ink document.

The ink-processing system 102 described herein also allows for efficient content selection on writing surfaces of any size and any input precision. For example, consider the case in which the writing surface is a relatively small touch-sensitive screen used by a handheld device. The ink-processing system 102 allows the user to navigate up a hierarchy of nodes even if the user's touch spans two or more elements in the ink document, or the user simultaneously selects more than one element in another way. In other words, the ink-processing system 102 applies the same selection algorithm regardless of whether the user's selection implicates a single element or plural elements.

B. Illustrative Processes

Figure 10:
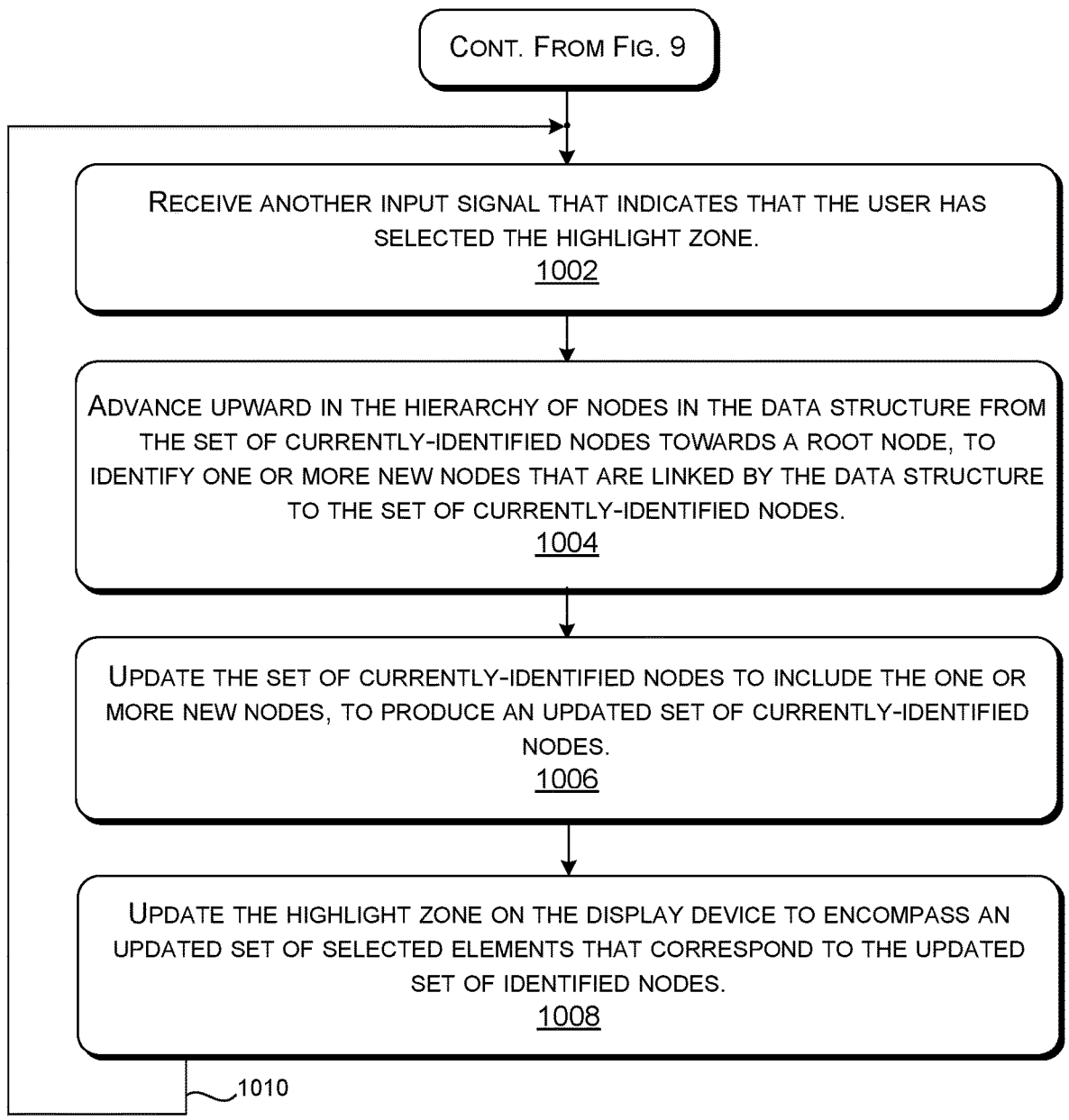

FIGS. 9-11 show processes that explain the operation of the ink-processing system 102 of Section A in flowchart form. Since the principles underlying the operation of the ink-processing system 102 have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

More specifically, FIGS. 9 and 10 together show a process 902 that provides an overview of the ink-processing system 102. In block 904 of FIG. 9, the ink-processing system 102 displays an ink document on a display device based on a data structure having a hierarchy of nodes that describes respective elements in the ink document. In some implementations, the data structure has been modified to facilitate structured interaction by a user with the elements in the ink document. In block 906, the ink-processing system 102 receives an input signal that indicates that the user has selected at least one element of the ink document using an input device, the element(s) that is selected corresponding to an initial set of selected elements. In block 908, the ink-processing system 102 identifies at least one node in the data structure that is associated with the initial set of selected elements, the node(s) that is identified corresponding to a set of currently-identified nodes, each node in the set of currently-identified nodes corresponding to an ink object having a smallest selectable semantic scope. In block 910, the ink-processing system 102 highlights a part of the ink document displayed on the display device that encompasses the set of selected elements, the part that is highlighted corresponding to a selection zone.

Advancing to FIG. 10, in block 1002, the ink-processing system 102 receives another input signal that indicates that the user has selected the selection zone. In block 1004, the ink-processing system 102 advances upward in the hierarchy of nodes in the data structure from the set of currently-identified nodes towards a root node, to identify one or more new nodes that are linked by the data structure to the set of currently-identified nodes. In block 1006, the ink-processing system updates the currently-identified nodes to include the one or more new nodes, to produce an updated set of currently-identified nodes. In block 1008, the ink-processing system 102 updates the selection zone on the display device to encompass an updated set of selected elements that correspond to the updated set of identified nodes. The loop 1010 indicates that the ink-processing system 102 can repeat the operations of receiving another input signal, advancing upward, updating the set of currently-identified nodes, and updating the selection zone at least one time.

FIG. 11 shows an optional process 1102 that explains how the preprocessing component 114 modifies an original data structure. In block 1104, the preprocessing component 114 receives an original data structure produced by an ink analysis engine, the original data structure having nodes that describe respective elements in the ink document. In block 1106, the preprocessing component produces a modified data structure that includes a hierarchy of nodes, the hierarchy of nodes having an arrangement of nodes that differs from an original arrangement of nodes in the original data structure.

C. Representative Computing Functionality

FIG. 12 shows an example of computing equipment that can be used to implement any of the systems summarized above. The computing equipment includes a set of user computing devices 1202 coupled to a set of servers 1204 via a computer network 1206. Each user computing device can correspond to any device that performs a computing function, including a desktop computing device, a laptop computing device, a handheld computing device of any type (e.g., a smartphone, a tablet-type computing device, etc.), a mixed reality device, a wearable computing device, an Internet-of-Things (IoT) device, a gaming system, and so on. The computer network 1206 can be implemented as a local area network, a wide area network (e.g., the Internet), one or more point-to-point links, or any combination thereof.

FIG. 12 also indicates that ink-processing system 102 can be spread across the user computing devices 1202 and/or the servers 1304 in any manner. For instance, in one case, the ink-processing system 102 is entirely implemented by each user computing device. But in another implementation, any aspect of the functions performed by the ink-processing system 102 can instead, or in addition, be performed by remote server or servers. Although not shown in FIG. 12, each user computing device incorporates a local instance of the ink capture device 106. But here too, aspects of the processing performed by the ink capture device 106 can be allocated to a remote server or servers and/or one or more other local devices.

Figure 13:
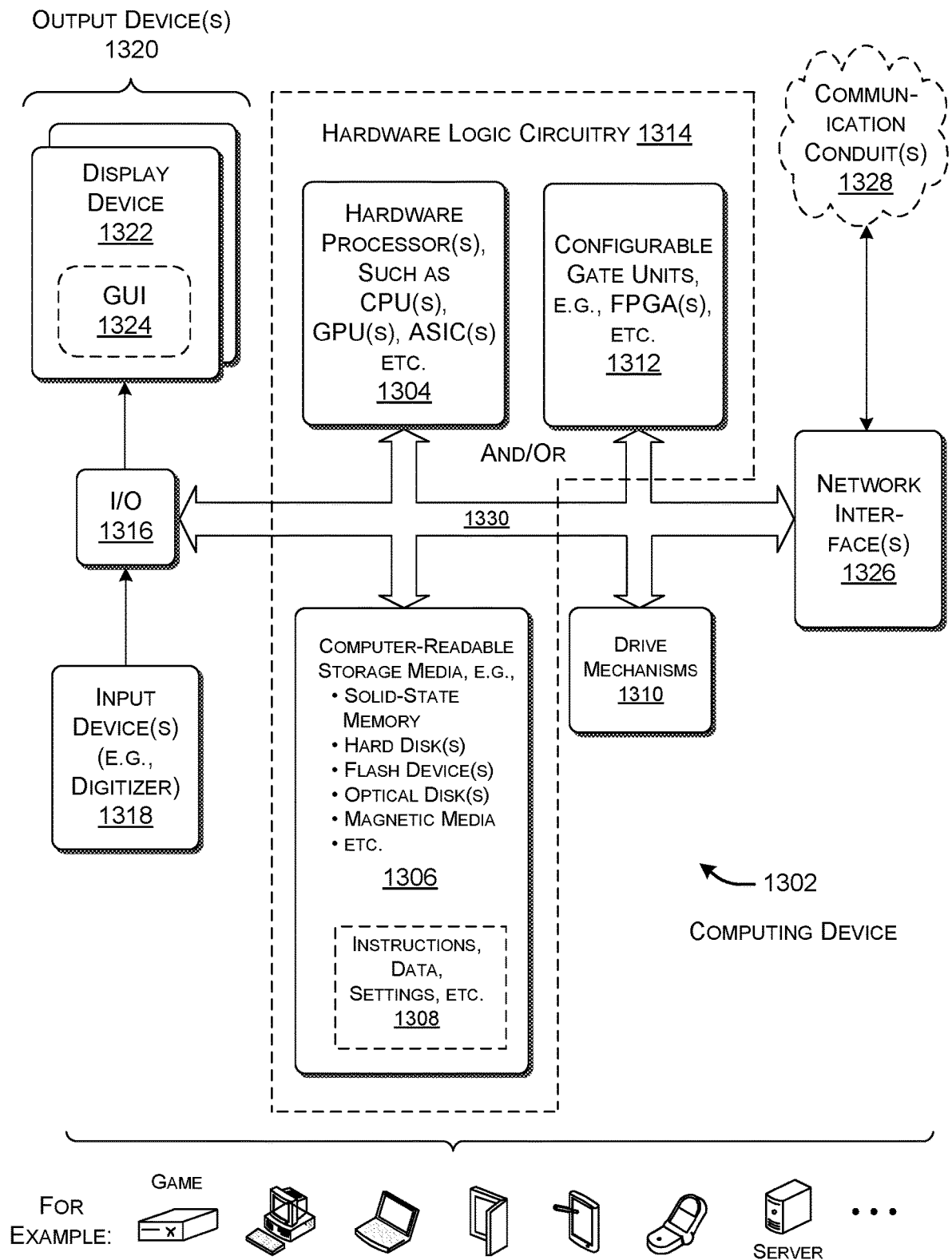
FIG. 13 shows an illustrative type of computing device that can be used in the computing equipment of FIG. 12.

FIG. 13 shows a computing device 1302 that can be used to implement any aspect of the equipment shown in FIG. 12. For instance, the type of computing device 1302 shown in FIG. 13 can be used to implement any user computing device or any server shown in FIG. 12. In all cases, the computing device 1302 represents a physical and tangible processing mechanism.

The computing device 1302 can include one or more hardware processors 1304. The hardware processor(s) 1304 can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processor unit.

The computing device 1302 can also include computer-readable storage media 1306, corresponding to one or more computer-readable media hardware units. The computer-readable storage media 1306 retains any kind of information 1308, such as machine-readable instructions, settings, data, etc. Without limitation, the computer-readable storage media 1306 may include one or more solid-state devices, one or more magnetic hard disks, one or more optical disks, magnetic tape, and so on. Any instance of the computer-readable storage media 1306 can use any technology for storing and retrieving information. Further, any instance of the computer-readable storage media 1306 may represent a fixed or removable unit of the computing device 1302. Further, any instance of the computer-readable storage media 1306 may provide volatile or non-volatile retention of information.

The computing device 1302 can utilize any instance of the computer-readable storage media 1306 in different ways. For example, any instance of the computer-readable storage media 1306 may represent a hardware memory unit (such as Random Access Memory (RAM)) for storing transient information during execution of a program by the computing device 1302, and/or a hardware storage unit (such as a hard disk) for retaining/archiving information on a more permanent basis. In the latter case, the computing device 1302 also includes one or more drive mechanisms 1310 (such as a hard drive mechanism) for storing and retrieving information from an instance of the computer-readable storage media 1306.

The computing device 1302 may perform any of the functions described above when the hardware processor(s) 1304 carry out computer-readable instructions stored in any instance of the computer-readable storage media 1306. For instance, the computing device 1302 may carry out computer-readable instructions to perform each block of the processes described in Section B.

Alternatively, or in addition, the computing device 1302 may rely on one or more configurable gate units 1312 to perform operations using a task-specific collection of logic gates. For instance, the configurable gate unit(s) 1312 may include a fixed configuration of hardware logic gates, e.g., that are created and set at the time of manufacture, and thereafter unalterable. Alternatively, or in addition, the configurable gate unit(s) 1312 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 13 generally indicates that hardware logic circuitry 1314 includes any combination of the hardware processor(s) 1304, the computer-readable storage media 1306, and/or the configurable gate unit(s) 1312. That is, the computing device 1302 can employ any combination of the hardware processor(s) 1304 that execute machine-readable instructions provided in the computer-readable storage media 1306, and/or one or more other configurable gate unit(s) 1312 that perform operations using a fixed and/or programmable collection of hardware logic gates. More generally stated, the hardware logic circuitry 1314 corresponds to one or more hardware logic units of any type(s) that perform operations based on logic stored in and/or otherwise embodied in the hardware logic unit(s).

In some cases (e.g., in the case in which the computing device 1302 represents a user computing device), the computing device 1302 also includes an input/output interface 1316 for receiving various inputs (via input devices 1318), and for providing various outputs (via output devices 1320). Illustrative input devices include at least a digitizer, and may also include a keyboard, voice detection mechanism, etc. One particular output mechanism may include a display device 1322 and an associated graphical user interface presentation (GUI) 1324. Illustrative types of display devices where described above in Section A. The computing device 1302 can also include one or more network interfaces 1326 for exchanging data with other devices via one or more communication conduits 1328. One or more communication buses 1330 communicatively couple the above-described units together.

The communication conduit(s) 1328 can be implemented in any manner, e.g., by a local area computer network, a wide area computer network (e.g., the Internet), point-to-point connections, etc., or any combination thereof. The communication conduit(s) 1328 can include any combination of hardwired links, wireless links, routers, gateway functionality, name servers, etc., governed by any protocol or combination of protocols.

FIG. 13 shows the computing device 1302 as being composed of a discrete collection of separate units. In some cases, the collection of units may correspond to discrete hardware units provided in a computing device chassis having any form factor. FIG. 13 shows illustrative form factors in its bottom portion. In other cases, the computing device 1302 can include a hardware logic unit that integrates the functions of two or more of the units shown in FIG. 1. For instance, the computing device 1302 can include a system on a chip (SoC or SOC), corresponding to an integrated circuit that combines the functions of two or more of the units shown in FIG. 13.

The following summary provides a non-exhaustive set of illustrative examples of the technology set forth herein.

According to a first example, a method is described for selecting elements in an ink document. The method includes: displaying the ink document on a display device based on a data structure having a hierarchy of nodes that describes respective elements in the ink document, the data structure having been modified to facilitate structured interaction by a user with the elements in the ink document; receiving an input signal that indicates that the user has selected at least one element of the ink document using an input device, the aforementioned at least one element that is selected corresponding to an initial set of selected elements; identifying at least one node in the data structure that is associated with the initial set of selected elements, the aforementioned at least one node that is identified corresponding to a set of currently-identified nodes, each node in the set of currently-identified nodes corresponding to an ink object having a smallest selectable semantic scope; highlighting a part of the ink document displayed on the display device that encompasses the set of selected elements, the part that is highlighted corresponding to a selection zone; receiving another input signal that indicates that the user has selected the selection zone; advancing upward in the hierarchy of nodes in the data structure from the set of currently-identified nodes towards a root node, to identify one or more new nodes that are linked by the data structure to the set of currently-identified nodes; updating the set of currently-identified nodes to include the one or more new nodes, to produce an updated set of currently-identified nodes; and updating the selection zone on the display device to encompass an updated set of selected elements that correspond to the updated set of identified nodes.

According to a second example, the method further includes producing the data structure by modifying an original data structure received from an ink analysis engine.

According to a third example, relating to the second example, the operation of modifying of the original data structure includes changing an order of nodes compared to an order given in the original data structure, and/or splitting at least one original paragraph node in the original data structure into two or more new paragraph nodes.

According to a fourth example, the operations further include repeating the operation of receiving another input signal, advancing upward, updating the set of currently-identified nodes, and updating the selection zone at least one time.

According to a fifth example, relating to the fourth element, at any stage of selection, the updated set of currently-identified nodes includes at least all nodes subsumed under a highest-selected node in the hierarchy of nodes.

According to a sixth example, the initial set of selected elements includes a single element.

According to a seventh example, the initial set of selected elements includes at least two elements that the user has simultaneously selected in the ink document using a selection implement. Here, the selection zone that is presented in response to selection of the initial set of selected elements encompasses at least the initial set of selected elements.

According to an eighth example, relating to the seventh example, the operation of advancing upward advances along at least two paths that start from at least two respective nodes associated with the aforementioned at least two elements that the user has simultaneously selected.

According to a ninth example, the method further includes: identifying at least one element in the ink document that has a prescribed spatial relationship to a current set of selected elements identified by traversing the hierarchy of nodes, but is not now within the current set of selected elements, the aforementioned at least one element that is identified corresponding to a set of spatially-related elements; and adding the set of spatially-related elements to the current set of selected elements.

According to a tenth example, relating to the ninth example, the operation of identifying at least one element is triggering in response to reaching a particular kind of node in the hierarchy of nodes.

According to an eleventh example, relating to the ninth example, the operation of identifying at least one element is performed by searching a spatial search region that includes the current set of selected elements.

According to a twelfth example, a computing system is described for selecting elements in an ink document. The computing system includes hardware logic circuitry that has one or more hardware processors and/or one or more configurable gate units. The hardware logic circuitry is configured to perform the operations of: receiving an original data structure produced by an ink analysis engine, the original data structure having nodes that describe respective elements in the ink document; producing a modified data structure that includes a hierarchy of nodes, the hierarchy of nodes having an arrangement of nodes that differs from an original arrangement of nodes in the original data structure; displaying the ink document on a display device based on the modified data structure; receiving an input signal that indicates that the user has selected at least one element of the ink document using an input device, the aforementioned at least one element that is selected corresponding to an initial set of selected elements; identifying at least one node in the modified data structure that is associated with the initial set of selected elements, the aforementioned at least one node that is identified corresponding to a set of currently-identified nodes, each node in the set of currently-identified nodes corresponding to an ink object having a smallest selectable semantic scope; highlighting a part of the ink document displayed on the display device that encompasses the set of selected elements, the part that is highlighted corresponding to a selection zone; receiving another input signal that indicates that the user has selected the selection zone; advancing upward in the hierarchy of nodes in the modified data structure from the set of currently-identified nodes towards a root node, to identify one or more new nodes that are linked by the modified data structure to the set of currently-identified nodes; updating the set of currently-identified nodes to include the one or more new nodes, to produce an updated set of currently-identified nodes; and updating the selection zone on the display device to encompass an updated set of selected elements that correspond to the updated set of identified nodes.

According to a thirteenth example, relating to the twelfth example, the operation of producing of the modified data structure includes: identifying a set of horizontally-arranged child elements associated with a particular parent node; and arranging nodes of the horizontally-arranged child elements in a prescribed order in the modified data structure, based on relative placement of the horizontally-arranged child elements in the ink document.

According to a fourteenth example, relating to the twelfth example, the operation of producing of the modified data structure includes: identifying a set of vertically-arranged child elements associated with a particular parent node; and arranging nodes of the vertically-arranged child elements in a prescribed order in the modified data structure, based on relative placement of the vertically-arranged child elements in the ink document.

According to a fifteenth example, relating to the twelfth example, the operation of producing of the modified data structure includes: identifying a paragraph element within which at least one instance of non-paragraph content appears; and splitting up the paragraph element by representing the paragraph element using two or more paragraph nodes in the modified data structure.

According to a sixteenth example, relating to the twelfth example, the operation of producing of the modified data structure includes: identifying a paragraph element that includes at least two neighboring lines separated by more than a prescribed distance; and splitting up the paragraph element by representing the paragraph element using two or more paragraph nodes in the modified data structure.

According to a seventeenth example, relating to the twelfth example, the operations further include repeating the operations of receiving another input signal, advancing upward, updating the set of currently-identified nodes, and updating the selection zone at least one time.

According to an eighteenth example, relating to the twelfth example, the initial set of selected elements includes at least two elements that the user has simultaneously selected in the ink document using a selection implement. Here, the selection zone that is presented in response to selection of the initial set of selected elements encompasses at least the initial set of selected elements.

According to a nineteenth example, relating to the twelfth example, the operations further include: identifying at least one element in the ink document that has a prescribed spatial relationship to a current set of selected elements identified by traversing the hierarchy of nodes, but is not now within the current set of selected elements, the aforementioned at least one element that is identified corresponding to a set of spatially-related elements; and adding the set of spatially-related elements to the current set of selected elements.

According to a twentieth example, a computer-readable storage medium for storing computer-readable instructions is described. The computer-readable instructions, when executed by one or more hardware processors, perform a method that includes: displaying an ink document on a display device based on a data structure having a hierarchy of nodes that describes respective elements in the ink document; receiving an input signal that indicates that the user has selected at least one element of the ink document using an input device, the aforementioned at least one element that is selected corresponding to an initial set of selected elements; identifying at least one node in the data structure that is associated with the initial set of selected elements, the aforementioned at least one node that is identified corresponding to a set of currently-identified nodes, each node in the set of currently-identified nodes corresponding to an ink object having a smallest selectable semantic scope; highlighting a part of the ink document displayed on the display device that encompasses the set of selected elements, the part that is highlighted corresponding to a selection zone; receiving another input signal that indicates that the user has selected the selection zone; advancing upward in the hierarchy of nodes in the data structure from the set of currently-identified nodes towards a root node, to identify one or more new nodes that are linked by the data structure to the set of currently-identified nodes; updating the set of currently-identified nodes to include the aforementioned one or more new nodes, to produce an updated set of currently-identified nodes; updating the selection zone on the display device to encompass an updated set of selected elements that correspond to the updated set of identified nodes; and repeating the operation of receiving another input signal, advancing upward, updating the set of the currently-identified nodes, and updating the selection zone at least one time to progressively expand the selection zone.

A twenty-first example corresponds to any combination (e.g., any logically consistent permutation or set) of the above-referenced first through twentieth examples.

A twenty-second example corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first examples.

In closing, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for selecting elements in an ink document, comprising:
   receiving an original data structure produced by parsing ink strokes in the ink document, the original data structure having nodes that describe respective elements in the ink document, an original arrangement of the nodes in the original data structure describing an organization of the elements in the ink document;
   producing a modified data structure that includes a hierarchy of nodes, the hierarchy of nodes having an arrangement of nodes that differs from the original arrangement of nodes in the original data structure;
   processing input signals received in response to repeated selection by a user of a particular element in the ink document; and
   identifying a set of nodes in the modified data structure upon each selection of the particular element by the user, and highlighting a particular set of elements in the ink document corresponding to the set of nodes on a display device,
   said producing of the modified data structure being performed by logic that includes each of:
   identifying a particular parent node in the original data structure, the particular parent node having a set of child nodes arranged in an original order;
   determining a type of element that the particular parent node represents, and determining a particular direction of flow of child elements associated with the type, different kinds of parent nodes being associated with different directions of flow;
   identifying a correct order of elements in a set of child elements in the ink document associated with the set of child nodes, as specified by positions of the child elements and the particular direction of flow; and
   determining that the original order differs from the correct order of the elements in the set of child elements, and changing an order of the child nodes compared to the original order to conform to the correct order of the elements in set of child elements, to produce a reordered set of child nodes, and including the reordered set of child nodes in the modified data structure.

2. The method of claim 1, wherein the correct order of elements in the set of child elements is determined based on positions of respective bounding boxes associated with the elements in the set of child elements.

3. The method of claim 1,
   wherein the particular parent node is classified as a line parent node that represents line element in the original data structure,
   wherein the particular direction of flow of elements in the set of child elements for the line parent node is a set of horizontally-flowing elements, and
   wherein the correct order of the horizontally-following elements in the ink document is determined based on left-most coordinates of respective bounding boxes of the horizontally-flowing elements.

4. The method of claim 3,
   wherein respective bounding boxes of at least two elements associated with the set of child nodes have a same left-most coordinate, and
   wherein the correct order of said at least two elements is also determined by respective top-most coordinates of the bounding boxes associated with said at least two elements.

5. The method of claim 1,
   wherein the particular parent node is classified as a list parent node or a paragraph parent node that respectively represents a list element or a paragraph element in the original data structure,
   wherein the particular direction of flow of elements in the set of child elements for the list parent node or the paragraph part node is a set of vertically-flowing elements, and
   wherein the correct order of the vertically-following elements in the ink document is determined based on top-most coordinates of respective bounding boxes of the vertically-flowing elements.

6. The method of claim 5,
   wherein respective bounding boxes of at least two elements associated with the set of child nodes have a same top-most coordinate, and
   wherein the correct order of said at least two elements is also determined by respective left-most coordinates of the bounding boxes associated with said at least two elements.

7. The method of claim 1, wherein said producing of the modified data structure is performed by logic that includes each of:
   identifying a single paragraph parent node in the original data structure that describes a paragraph element in the ink document; and
   determining that there is a non-paragraph element in the ink document within a vertical span of the paragraph element, and splitting up the single paragraph parent node into two paragraph nodes and including the two paragraph nodes in the modified data structure, the two paragraph nodes including a first paragraph node associated with a first paragraph that is positioned above the non-paragraph element in the ink document, and a second paragraph node associated with a second paragraph that is positioned below the non-paragraph element in the ink document.

8. The method of claim 1, wherein said producing of the modified data structure is performed by logic that includes each of:
identifying a single paragraph parent node in the original data structure that describes a paragraph element in the ink document; and
determining that the paragraph element has a pair of neighboring lines that are farther apart than a prescribed threshold value, and splitting up the single paragraph parent node into two paragraph nodes and including the two paragraph nodes in the modified data structure, the two paragraph nodes including a first paragraph node associated with a first paragraph element that includes a first of the pair of neighboring lines, and a second paragraph node that is associated with a second paragraph element that includes a second of the pair of neighboring lines.

9. The method of claim 8, wherein the method further comprises determining that the second paragraph element has a pair of neighboring lines that are farther apart than the prescribed threshold value, and in response thereto splitting up the second paragraph node into two paragraph nodes, and including the two paragraph nodes associated with the second paragraph node in the modified data structure.

10. The method of claim 1, wherein one particular direction of flow for one kind of parent node is right to left, and wherein another particular direction of flow for another kind of parent node is top to bottom.

11. A computing system for selecting elements in an ink document, comprising:
hardware logic circuitry that includes one or more hardware processors and/or one or more configurable gate units, the hardware logic circuitry being configured to perform operations of:
generating an original data structure by parsing ink strokes in the ink document, the original data structure having nodes that describe respective elements in the ink document, an original arrangement of the nodes in the original data structure describing an organization of the elements in the ink document;
producing a modified data structure that includes a hierarchy of nodes, the hierarchy of nodes having an arrangement of nodes that differs from the original arrangement of nodes in the original data structure;
processing input signals received in response to repeated selection by a user of a particular element in the ink document; and
identifying a set of nodes in the modified data structure upon each selection of the particular element by the user, and highlighting a particular set of elements in the ink document corresponding to the set of nodes on a display device,
said producing of the modified data structure being performed by logic that includes each of:
identifying a particular parent node in the original data structure, the particular parent node having a set of child nodes arranged in an original order;
determining a type of element that the particular parent node represents, and determining a particular direction of flow of child elements associated with the type, different kinds of parent nodes being associated with different directions of flow;
identifying a correct order of elements in a set of child elements in the ink document associated with the set of child nodes, as specified by positions of the child elements and the particular direction of flow; and
determining that the original order differs from the correct order of the elements in the set of child elements, and changing an order of the child nodes compared to the original order to conform to the correct order of the elements in set of child elements, to produce a reordered set of child nodes, and including the reordered set of child nodes in the modified data structure.

12. The computing system of claim 11,
wherein the particular parent node is classified as a line parent node that represents a line element in the original data structure,
wherein the particular direction of flow of elements in the set of child elements for the line parent node is a set of horizontally-flowing elements, and
wherein the correct order of the horizontally-following elements in the ink document is determined based on left-most coordinates of respective bounding boxes of the horizontally-flowing elements.

13. The computing system of claim 11,
wherein the particular parent node is classified as a list parent node or a paragraph parent node that respectively represents a list element or a paragraph element in the original data structure,
wherein the particular direction of flow of elements in the set of child elements for the list parent node or the paragraph part node is a set of vertically-flowing elements, and
wherein the correct order of the vertically-following elements in the ink document is determined based on top-most coordinates of respective bounding boxes of the vertically-flowing elements.

14. The computing system of claim 11, wherein said producing of the modified data structure is performed by logic that includes each of:
identifying a single paragraph parent node in the original data structure that describes a paragraph element in the ink document; and
determining that there is a non-paragraph element in the ink document within a vertical span of the paragraph element, and splitting up the single paragraph parent node into two paragraph nodes and including the two paragraph nodes in the modified data structure, the two paragraph nodes including a first paragraph node associated with a first paragraph that is positioned above the non-paragraph element in the ink document, and a second paragraph node associated with a second paragraph that is positioned below the non-paragraph element in the ink document.

15. The computing system of claim 11, wherein said producing of the modified data structure is performed by logic that includes each of:
identifying a single paragraph parent node in the original data structure that describes a paragraph element in the ink document; and
determining that the paragraph element has a pair of neighboring lines that are farther apart than a prescribed threshold value, and splitting up the single paragraph parent node into two paragraph nodes and including the two paragraph nodes in the modified data structure, the two paragraph nodes including a first paragraph node associated with a first paragraph element that includes a first of the pair of neighboring lines, and a second paragraph node that is associated with a second paragraph element that includes a second of the pair of neighboring lines.

16. The computing system of claim 15,
wherein said producing determines whether the second paragraph element includes another pair of neighboring lines that are farther apart than the prescribed distance, and
wherein the method further comprises determining that the second paragraph element has a pair of neighboring lines that are farther apart than the prescribed threshold value, and in response thereto, splitting up the second paragraph node into two paragraph nodes, and including the two paragraph nodes associated with the second paragraph node in the modified data structure.

17. A computer-readable storage medium for storing computer-readable instructions, hardware logic circuitry executing the computer-readable instructions to perform operations that comprise:
generating an original data structure by parsing ink strokes in the ink document, the original data structure having nodes that describe respective elements in the ink document, an original arrangement of the nodes in the original data structure describing an organization of the elements in the ink document;
producing a modified data structure that includes a hierarchy of nodes, the hierarchy of nodes having an arrangement of nodes that differs from the original arrangement of nodes in the original data structure,
the modified data structure including a different ordering of nodes compared to an order of the nodes in the original data structure, and/or at least one additional parent node compared to parent nodes in the original data structure;
processing input signals received in response to repeated selection by a user of a particular element in the ink document; and
identifying a set of nodes in the modified data structure upon each selection of the particular element by the user, and highlighting a particular set of elements in the ink document corresponding to the set of nodes on a display device,
said producing of the modified data structure being performed by logic that includes each of:
identifying a single paragraph parent node in the original data structure that describes a paragraph element in the ink document; and
determining that there is a non-paragraph element in the ink document within a vertical span of the paragraph element, and splitting up the single paragraph parent node into two paragraph nodes and including the two paragraph nodes in the modified data structure, the two paragraph nodes including a first paragraph node associated with a first paragraph that is positioned above the non-paragraph element in the ink document, and a second paragraph node associated with a second paragraph that is positioned below the non-paragraph element in the ink document.

18. The computing system of claim 11, wherein one particular direction of flow for one kind of parent node is right to left, and wherein another particular direction of flow for another kind of parent node is top to bottom.

* * * * *